United States Patent
Moad et al.

(10) Patent No.: US 7,837,899 B2
(45) Date of Patent: Nov. 23, 2010

(54) DISPERSING AGENTS IN NANOCOMPOSITES

(75) Inventors: Graeme Moad, Sassafras (AU); George Philip Simon, Glenhuntly (AU); Katherine Maree Dean, Collingwood (AU); Guoxin Li, Mulgrave (AU); Roshan Tyrrel Anton Mayadunne, Wheelers Hill (AU); Hendrik Wermter, Bensheim (DE); Rudolf Pfaendner, Rimbach (DE)

(73) Assignee: Polymers Australia Pty. Ltd., Victoria (AU)

( * ) Notice: Subject to any disclaimer, the term of this patent is extended or adjusted under 35 U.S.C. 154(b) by 283 days.

(21) Appl. No.: 10/547,264

(22) PCT Filed: Feb. 23, 2004

(86) PCT No.: PCT/EP2004/050183

§ 371 (c)(1),
(2), (4) Date: Aug. 29, 2005

(87) PCT Pub. No.: WO2004/078785

PCT Pub. Date: Sep. 16, 2004

(65) Prior Publication Data

US 2007/0072979 A1    Mar. 29, 2007

(30) Foreign Application Priority Data

Mar. 3, 2003    (EP) .................................. 03405141

(51) Int. Cl.
*B01F 3/12*    (2006.01)
(52) U.S. Cl. ................. 252/378 R; 252/363.5
(58) Field of Classification Search ........... 524/1; 252/363.5, 378 R
See application file for complete search history.

(56) References Cited

U.S. PATENT DOCUMENTS

| | | | | |
|---|---|---|---|---|
| 3,250,759 | A | 5/1966 | Bodanszky et al. | 260/112.5 |
| 4,650,818 | A | 3/1987 | Oka et al. | 523/205 |
| 5,760,121 | A | 6/1998 | Beall et al. | 524/450 |
| 5,939,184 | A | 8/1999 | Inoue et al. | 428/331 |
| 5,973,053 | A | 10/1999 | Usuki et al. | 524/445 |
| 6,130,196 | A | 10/2000 | Mondin et al. | 510/384 |
| 6,197,849 | B1 | 3/2001 | Zilg et al. | 523/216 |
| 6,579,927 | B1 | 6/2003 | Fischer | 524/445 |
| 2002/0137833 | A1* | 9/2002 | Loontjens et al. | 524/445 |
| 2003/0065355 | A1* | 4/2003 | Weber | 606/200 |
| 2005/0101740 | A1* | 5/2005 | Mougin | 525/242 |

FOREIGN PATENT DOCUMENTS

| | | | |
|---|---|---|---|
| WO | 99/07790 | * | 2/1999 |
| WO | 99/42518 | | 8/1999 |
| WO | 00/34393 | * | 6/2000 |
| WO | 01/48080 | | 7/2001 |
| WO | 01/85831 | | 11/2001 |
| WO | 02/00776 | | 1/2002 |
| WO | 03/059817 | | 7/2003 |

OTHER PUBLICATIONS

Patent Abstracts of Japan (JP-A-2002/322226) published Nov. 2002.
Journal of the American Chemical Society, Bodanszky et al., vol. 84, pp. 4943-4948 (1962).
Pharmacological Research: The Official Journal of the Italian Pharmacological Society, R. Korolkiewicz et al., vol. 44, No. 1, pp. 47-51 (2001).
Journal of Pharmacology and Experimental Therapeutics, Bin Liu et al. vol. 298, No. 3, pp. 1133-1141 (Apr. 2001).
Ultrasound in Medicine and Biology, Haake et al., vol. 27, No. 2, pp. 279-284 (2001).
Progress in Organic Coatings, C. Auschra et al., vol. 45, No. 2, pp. 83-93 (2002).
Hans Zweifel (editor), Plastics Additives Handbook, 5$^{th}$ Edition, pp. 901-948 (2001).
Macromolecules, Kawasumi et al., vol. 30, No. 20, pp. 6333-6338 (1997).
B. Liao et al., Polymer, vol. 42, No. 25, pp. 10007-10011 (2001).
English Language abstract of JP-A-2000-281847.
English Language abstract JP-A-2000-281841.
English Language abstract JP-A-2004-149565.
English Language Translation of JP-A-2002-313137.
English Language abstract JP-A-2002-338775.
English Language abstract JP-A-07-053841.
English Language abstract JP-A-09-118754.
J. Pyun et al. Chem. Mater, 13, pp. 3436-3446 (2001).
D. Colombani, Prog. Pol. Sc. 22, pp. 1649 (1997).

* cited by examiner

*Primary Examiner*—Lorna M Douyon
*Assistant Examiner*—Amina Khan
(74) *Attorney, Agent, or Firm*—Shiela A. Loggins

(57) ABSTRACT

The instant invention discloses a composition, preferably a nanocomposite material, comprising (a) a synthetic polymer, (b) a filler selected from a natural or synthetic phyllosilicate or a mixture of such phyllosilicates, preferably in nanoparticles, and (c) a dispersing agent prepared by controlled free radical polymerization (CFRP).

15 Claims, No Drawings

DISPERSING AGENTS IN NANOCOMPOSITES

The present invention relates to a composition, preferably a nanocomposite material, comprising (a) a synthetic polymer, especially a polyolefin, (b) a filler, especially a natural or synthetic phyllosilicate or a mixture of such phyllosilicates, preferably in nanoparticles, and (c) a dispersing agent prepared by controlled free radical polymerization (CFRP). The present invention relates also to a process for the preparation of a synthetic polymer nanocomposite material which comprises melt mixing a mixture of a) a synthetic polymer, b) a filler, and c) a dispersing agent prepared by controlled free radical polymerization and to the use of the latter to intercalate and exfoliate a filler and disperse the filler in a synthetic polymer matrix to form a nanocomposite material.

The addition of fillers to organic materials, especially polymers, is known and is described for example in Hans Zweifel (editor), Plastics Additives Handbook, 5th Edition, pages 901-948, Hanser Publishers, Munich 2001. The use of fillers in polymers has the advantage that it is possible to bring about improvement in, for example, the mechanical properties, especially the density, hardness, rigidity (modulus) or reduced shrinkage of the polymer.

Using extremely small filler particles (with one dimension <200 nm), so-called nano-scale fillers, mechanical properties, heat distortion temperature stability or flame retardant property of the polymers can be improved with a much lower concentration, typically 2 to 10% by weight compared to 20 to 50% by weight with the normal micro-scale filler particles. Polymers containing nano-scale fillers combine favourable mechanical properties like strength, modulus and impact and show improved surface qualities like gloss lower tool wear during processing and better conditions for recycling. Coatings and films comprising nano-scale fillers show improved stability flame retardance, gas barrier properties and scratch resistance.

Nano-scale fillers possess an extremely large surface area with high surface energy. The deactivation of the surface energy and the compatibilization of the nano-scale fillers with a polymeric substrate is, therefore, even more important than with a common micro-scale filler in order to avoid aggregation during processing or conversion of the filled polymer and to reach an excellent dispersion of the nano-scaled filler in the final article.

There is a substantial recent literature on organic-inorganic nanocomposites based on clays or layered silicates such as montmorillonite and synthetic polymers. Polyolefin nanocomposites have been prepared from organic modified clays. The clays used are generally modified with alkyl or dialkyl ammonium ions or amines or in a few cases other onium ions, like for example phosphonium ions. The ammonium ion/amine additives are usually incorporated into the clay structure by a separate solution intercalation step.

These conventional organic modified clays have a number of disadvantages when used for the preparation of polyolefin nanocomposites. Ammonium salts are thermally unstable at temperatures used in polyolefin processing or may be otherwise reactive under processing conditions. These instabilities result in poor processing stability, inferior mechanical properties, discoloration, odor formation and reduced long-term stability in addition to the formation of volatile by-products.

In order to improve the polyolefin nanocomposite formation by melt processing the use of an additional compatibilizer has been proposed, most often a maleic anhydride grafted polypropylene, which in working examples is present as a major component of the final product.

M. Kawasumi et al., Macromolecules 1997, 30, 6333-6338 or U.S. Pat. No. 5,973,053 disclose that a polypropylene nanocomposite is obtained when a clay, premodified with octadecylammonium salts, is compounded with polypropylene in the presence of polyolefin oligomers containing polar functionality, for example maleic anhydride grafted polypropylene.

Although compatibilizers can improve the stability of nanocomposites mainly with regard to avoiding agglomeration of the filler, the other weaknesses of the nanocomposites are not improved.

It has now been found that improved synthetic polymer materials with better long term thermostability and with reduced odor and reduced undesired discoloration which occurs as a result of the decomposition of the modification agents, can be prepared by the use of a dispersing agent prepared by controlled free radical polymerization.

The present invention therefore provides a composition comprising
  a) a synthetic polymer,
  b) a filler, and
  c) a dispersing agent prepared by controlled free radical polymerization (CFRP).

Preferably, component (b) is a filler in nanoparticles.

Of interest are also compositions comprising as component (b) a filler in nanoparticles or a material which produces a filler in nanoparticles under processing conditions.

Component (c) is suitable for intercalating and exfoliating a filler and dispersing the filler in a synthetic polymer matrix, especially a thermoplastic polymer, to form a nanocomposite material.

Examples of Such Synthetic Polymers are:

1. Polymers of monoolefins and diolefins, for example polypropylene, polyisobutylene, poly(but-1-ene), poly(4-methylpent-1-ene), poly(vinylcyclohexane), polyisoprene or polybutadiene, as well as polymers of cycloolefins, for instance of cyclopentene or norbornene, polyethylene (which optionally can be crosslinked), for example high density polyethylene (HDPE), high density and high molecular weight polyethylene (HDPE-HMW), high density and ultra-high molecular weight polyethylene (HDPE-UHMW), medium density polyethylene (MDPE), low density polyethylene (LDPE), linear low density polyethylene (LLDPE), (VLDPE) and (ULDPE).

Polyolefins, i.e. the polymers of monoolefins exemplified in the preceding paragraph, preferably polyethylene and polypropylene, can be prepared by different, and especially by the following, methods:
  a) radical polymerisation (normally under high pressure and at elevated temperature).
  b) catalytic polymerisation using a catalyst that normally contains one or more than one metal of groups IVb, Vb, VIb or VIII of the Periodic Table. These metals usually have one or more than one ligand, typically oxides, halides, alcoholates, esters, ethers, amines, alkyls, alkenyls and/or aryls that may be either π- or σ-coordinated. These metal complexes may be in the free form or fixed on substrates, typically on activated magnesium chloride, titanium(III) chloride, alumina or silicon oxide. These catalysts may be soluble or insoluble in the polymerisation medium. The catalysts can be used by themselves in the polymerisation or further activators may be used, typically metal alkyls, metal hydrides, metal alkyl halides, metal alkyl oxides or metal alkyloxanes, said metals being elements of groups Ia, IIa and/or IIIa of the Periodic Table. The activators may be modified conveniently with further ester, ether, amine or silyl ether groups. These catalyst systems are usually termed Phillips, Standard Oil Indiana, Ziegler (-Natta), TNZ (DuPont), metallocene or single site catalysts (SSC).

2. Mixtures of the polymers mentioned under 1), for example mixtures of polypropylene with polyisobutylene, polypropylene with polyethylene (for example PP/HDPE, PP/LDPE) and mixtures of different types of polyethylene (for example LDPE/HDPE).

3. Copolymers of monoolefins and diolefins with each other or with other vinyl monomers, for example ethylene/propylene copolymers, linear low density polyethylene (LLDPE) and mixtures thereof with low density polyethylene (LDPE), propylene/but-1-ene copolymers, propylene/isobutylene copolymers, ethylene/but-1-ene copolymers, ethylene/hexene copolymers, ethylene/methylpentene copolymers, ethylene/heptene copolymers, ethylene/octene copolymers, ethylene/vinylcyclohexane copolymers, ethylene/cycloolefin copolymers (e.g. ethylene/norbornene like COC), ethylene/ 1-olefins copolymers, where the 1-olefin is generated in-situ; propylene/butadiene copolymers, isobutylene/isoprene copolymers, ethylene/vinylcyclohexene copolymers, ethylene/alkyl acrylate copolymers, ethylene/alkyl methacrylate copolymers, ethylene/vinyl acetate copolymers or ethylene/ acrylic acid copolymers and their salts (ionomers) as well as terpolymers of ethylene with propylene and a diene such as hexadiene, dicyclopentadiene or ethylidene-norbornene; and mixtures of such copolymers with one another and with polymers mentioned in 1) above, for example polypropylene/ ethylene-propylene copolymers, LDPE/ethylene-vinyl acetate copolymers (EVA), LDPE/ethylene-acrylic acid copolymers (EAA), LLDPE/EVA, LLDPE/EAA and alternating or random polyalkylene/carbon monoxide copolymers and mixtures thereof with other polymers, for example polyamides.

4. Hydrocarbon resins (for example $C_5$-$C_9$) including hydrogenated modifications thereof (e.g. tackifiers) and mixtures of polyalkylenes and starch.

Homopolymers and copolymers from 1.)-4.) may have any stereostructure including syndiotactic, isotactic, heterotactic or atactic. Stereoblock polymers are also included.

5. Polystyrene, poly(p-methylstyrene), poly(α-methylstyrene).

6. Aromatic homopolymers and copolymers derived from vinyl aromatic monomers including styrene, α-methylstyrene, all isomers of vinyl toluene, especially p-vinyltoluene, all isomers of ethylstyrene, propylstyrene, vinylbiphenyl, vinylnaphthalene, and vinylanthracene, and mixtures thereof. Homopolymers and copolymers may have any stereostructure including syndiotactic, isotactic, heterotactic or atactic; where atactic polymers are preferred. Stereoblock polymers are also included.

6a. Copolymers including aforementioned vinyl aromatic monomers and comonomers selected from ethylene, propylene, dienes, nitriles, acids, maleic anhydrides, maleimides, vinyl acetate and vinyl chloride or acrylic derivatives and mixtures thereof, for example styrene/butadiene, styrene/ acrylonitrile, styrene/ethylene (interpolymers), styrene/alkyl methacrylate, styrene/butadiene/alkyl acrylate, styrene/butadiene/alkyl methacrylate, styrene/maleic anhydride, styrene/ acrylonitrile/methyl acrylate; mixtures of high impact strength of styrene copolymers and another polymer, for example a polyacrylate, a diene polymer or an ethylene/propylene/diene terpolymer; and block copolymers of styrene such as styrene/butadiene/styrene, styrene/isoprene/styrene, styrene/ethylene/butylene/styrene or styrene/ethylene/propylene/styrene.

6b. Hydrogenated aromatic polymers derived from hydrogenation of polymers mentioned under 6.), especially including polycyclohexylethylene (PCHE) prepared by hydrogenating atactic polystyrene, often referred to as polyvinylcyclohexane (PVCH).

6c. Hydrogenated aromatic polymers derived from hydrogenation of polymers mentioned under 6a.).

Homopolymers and copolymers may have any stereostructure including syndiotactic, isotactic, hemi-isotactic or atactic; where atactic polymers are preferred. Stereoblock polymers are also included.

7. Graft copolymers of vinyl aromatic monomers such as styrene or α-methylstyrene, for example styrene on polybutadiene, styrene on polybutadiene-styrene or polybutadiene-acrylonitrile copolymers; styrene and acrylonitrile (or methacrylonitrile) on polybutadiene; styrene, acrylonitrile and methyl methacrylate on polybutadiene; styrene and maleic anhydride on polybutadiene; styrene, acrylonitrile and maleic anhydride or maleimide on polybutadiene; styrene and maleimide on polybutadiene; styrene and alkyl acrylates or methacrylates on polybutadiene; styrene and acrylonitrile on ethylene/propylene/diene terpolymers; styrene and acrylonitrile on poly(alkyl acrylates) or poly(alkyl methacrylates), styrene and acrylonitrile on acrylate/butadiene copolymers, as well as mixtures thereof with the copolymers listed under 6), for example the copolymer mixtures known as ABS, MBS, ASA or AES polymers.

8. Halogen-containing polymers such as polychloroprene, chlorinated rubbers, chlorinated and brominated copolymer of isobutylene-isoprene (halobutyl rubber), chlorinated or sulfo-chlorinated polyethylene, copolymers of ethylene and chlorinated ethylene, epichlorohydrin homo- and copolymers, especially polymers of halogen-containing vinyl compounds, for example poly(vinyl chloride), poly(vinylidene chloride), poly(vinyl fluoride), poly(vinylidene fluoride), as well as copolymers thereof such as vinyl chloride/vinylidene chloride, vinyl chloride/vinyl acetate or vinylidene chloride/ vinyl acetate copolymers.

9. Polymers derived from α,β-unsaturated acids and derivatives thereof such as polyacrylates and polymethacrylates; polymethyl methacrylates, polyacrylamides and polyacrylonitriles, which can be impact-modified with butyl acrylate.

10. Copolymers of the monomers mentioned under 9) with each other or with other unsaturated monomers, for example acrylonitrile/butadiene copolymers, acrylonitrile/alkyl acrylate copolymers, acrylonitrile/alkoxyalkyl acrylate or acrylonitrile/vinyl halide copolymers or acrylonitrile/alkyl methacrylate/butadiene terpolymers.

11. Polymers derived from unsaturated alcohols and amines or the acyl derivatives or acetals and their hydrolysis products, for example poly(vinyl alcohol), poly(vinyl acetate), poly(vinyl stearate), poly(vinyl benzoate), poly(vinyl maleate), poly(vinyl butyral), poly(allyl phthalate) or poly(allyl melamine); as well as their copolymers with olefins mentioned in 1) above.

12. Homopolymers and copolymers of cyclic ethers such as poly(alkylene glycols), poly(ethylene oxide), poly(propylene oxide) or copolymers thereof with bisglycidyl ethers.

13. Polyacetals such as polyoxymethylene and those polyoxymethylenes which contain ethylene oxide as a comonomer; polyacetals modified with thermoplastic polyurethanes, acrylates or MBS.

14. Polyphenylene oxides and sulfides, and mixtures of polyphenylene oxides with styrene polymers or polyamides.

15. Polyurethanes derived from hydroxyl-terminated polyethers, polyesters or polybutadienes on the one hand and aliphatic or aromatic polyisocyanates on the other, as well as precursors thereof.

16. Polyamides and copolyamides derived from diamines and dicarboxylic acids and/or from aminocarboxylic acids or the corresponding lactams, for example polyamide 4, polyamide 6, polyamide 6/6, 6/10, 6/9, 6/12, 4/6, 12/12, polyamide 11, polyamide 12, aromatic polyamides starting from m-xylene diamine and adipic acid; polyamides prepared from hexamethylenediamine and isophthalic or/and terephthalic acid and with or without an elastomer as modifier, for example poly-2,4,4,-trimethylhexamethylene terephthalamide or poly-m-phenylene isophthalamide; and also block copolymers of the aforementioned polyamides with polyolefins, olefin copolymers, ionomers or chemically bonded or grafted elastomers; or with polyethers, e.g. with polyethylene glycol, polypropylene glycol or polytetramethylene glycol; as well as polyamides or copolyamides modified with EPDM or ABS; and polyamides condensed during processing (RIM polyamide systems).

17. Polyureas, polyimides polyamide-imides, polyetherimids, polyesterimids, polyhydantoins and polybenzimidazoles.

18. Polyesters derived from dicarboxylic acids and diols and/or from hydroxycarboxylic acids or the corresponding lactones, for example polyethylene terephthalate, polybutylene terephthalate, poly-1,4-dimethylolcyclohexane terephthalate, polyalkylene naphthalate (PAN) and polyhydroxybenzoates, as well as block copolyether esters derived from hydroxyl-terminated polyethers; and also polyesters modified with polycarbonates or MBS.

19. Polycarbonates and polyester carbonates.

20. Polyketones.

21. Polysulfones, polyether sulfones and polyether ketones.

22. Crosslinked polymers derived from aldehydes on the one hand and phenols, ureas and melamines on the other hand, such as phenol/formaldehyde resins, urea/formaldehyde resins and melamine/formaldehyde resins.

23. Drying and non-drying alkyd resins.

24. Unsaturated polyester resins derived from copolyesters of saturated and unsaturated dicarboxylic acids with polyhydric alcohols and vinyl compounds as crosslinking agents, and also halogen-containing modifications thereof of low flammability.

25. Crosslinkable acrylic resins derived from substituted acrylates, for example epoxy acrylates, urethane acrylates or polyester acrylates.

26. Alkyd resins, polyester resins and acrylate resins crosslinked with melamine resins, urea resins, isocyanates, isocyanurates, polyisocyanates or epoxy resins.

27. Crosslinked epoxy resins derived from aliphatic, cycloaliphatic, heterocyclic or aromatic glycidyl compounds, e.g. products of diglycidyl ethers of bisphenol A and bisphenol F, which are crosslinked with customary hardeners such as anhydrides or amines, with or without accelerators.

28. Blends of the aforementioned polymers (polyblends), for example PP/EPDM, Polyamide/EPDM or ABS, PVC/EVA, PVC/ABS, PVC/MBS, PC/ABS, PBTP/ABS, PC/ASA, PC/PBT, PVC/CPE, PVC/acrylates, POM/thermoplastic PUR, PC/thermoplastic PUR, POM/acylate, POM/MBS, PPO/HIPS, PPO/PA 6.6 and copolymers, PA/HDPE, PA/PP, PA/PPO, PBT/PC/ABS or PBT/PET/PC.

The synthetic polymers to be protected are preferably thermoplastic polymers, especially polyolefins, polystyrenes, polyamides, polyesters, polyacrylates, most preferably polyolefins, in particular polyethylene and polypropylene or copolymers thereof with mono- and diolefins.

Preferred fillers are for example natural or synthetic phyllosilicates or a mixture of such phyllosilicates.

Of interest are compositions wherein component (b) is a natural or synthetic phyllosilicate or a mixture of such phyllosilicates wherein component (b) can be modified or unmodified by a modification agent such as, for example, an ammonium, an amine or a phosphonium compound.

Fillers of special interest are for example layered silicate clays. Of very special interest are compositions comprising as component (b) a montmorillonite, bentonite, beidelite, mica, hectorite, saponite, nontronite, sauconite, vermiculite, ledikite, magadite, kenyaite, stevensite, volkonskoite, hydrotalcite or a mixture thereof.

Component (b) can be unmodified or modified by a modification agent such as, for example, an ammonium, an amine or a phosphonium compound.

Examples of modification agents for nano-clays are for example:

1. Amine and ammonium compounds, for example, distearyldimethylammonium chloride, stearylbenzyldimethylammonium chloride, stearylamine, stearyldiethoxyamine or aminododecanoic acid [commercially available as Nanofil® from Südchemie, Germany]; dimethyl ditallow ammonium, trioctylmethyl ammonium, dipolyoxyethylenealkylmethyl ammonium or polyoxypropylenemethyldiethyl ammonium [commercially available as modified Somasif® from CO-OP Chemical]; octadecylamine, triethoxysilanyl-propylamine [commercially available as Nanomer® from Nanocor], polyalkoxylated ammonium compounds such as for example octadecyl bis(polyoxyethylene[15]amine [Ethomeen® from Eastman] or octadecyl methyl bis(polyoxyethylene[15]ammonium chloride [Etoquad® from Eastman] or just the corresponding free amines.

2. Phosphonium compounds, for example tetrabutylphosphonium or octadecyl triphenyl phosphonium [commercially available from Eastman].

3. Others, for example, triethoxy octyl silane [commercially available as Nanomer® from Nanocor], ammonium, sulfonium or pyridium compounds as disclosed for example in WO-A-01/04050 or WO-A-99/67790; block graft copolymers such as for example PEO-b-PS or poly-4-vinylpyridine-b-PS; or solvents for swelling such as for example γ-butyrolactone, 2-pyrrolidone, dimethylsulfoxide, diglyme, tetrahydrofuran or furfuryl alcohol.

Compositions which are of interest include those comprising as component (c) a random, block, star or comb copolymer prepared by controlled free radical polymerization.

Such dispersing agents prepared by controlled free radical polymerization are known. Their preparation is disclosed for example in C. Auschra et al., Progress in Organic Coatings 45, 83-93 (2002).

The preparation of the dispersing agents by controlled free radical polymerization (CFRP) can preferably occur by four suitable routes:

a1) Polymerization in the presence of alkoxyamine initiator/regulator compounds;
a2) Polymerization in the presence of a stable nitroxyl free radical and a radical initiator (source of free radicals);
a3) Polymerization under atom transfer radical polymerization (ATRP); or
a4) RAFT polymerization which refers to a method of polymer synthesis by radical polymerization using chain transfer agents which react by reversible addition—fragmentation chain transfer.

For example U.S. Pat. No. 4,581,429 or EP-A-0 621 878 discloses the preparation of block copolymers by method a1).

For example EP-A-0 621 878 discloses the preparation of block copolymers by method a2).

For example WO-A-01/51534 discloses the preparation of comb copolymers by the ATRP method a3).

For example WO-A-99/31144 discloses the preparation of block copolymers by method a4).

Preferred chain transfer agents include thiocarbonylthio chain transfer agents of formulae I, II and III, and macromonomers of formula IV and a combination thereof,

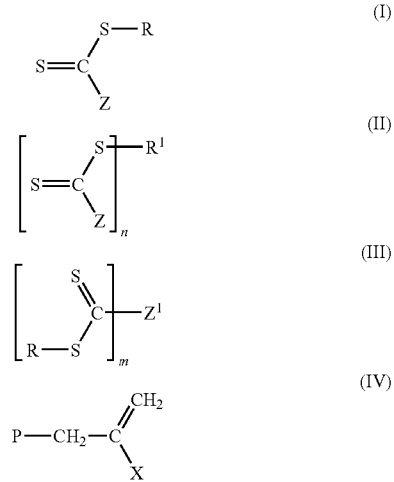

wherein R, R$^1$ and P are free radical leaving groups; and wherein,

R is selected from the group consisting of unsubstituted or substituted C$_1$-C$_{18}$alkyl, unsubstituted or substituted C$_2$-C$_{18}$alkenyl, unsubstituted or substituted C$_2$-C$_{18}$alkynyl, unsubstituted or substituted saturated carbocyclic ring, unsubstituted or substituted unsaturated carbocyclic ring, unsubstituted or substituted aromatic carbocyclic ring, unsubstituted or substituted saturated heterocyclic ring, unsubstituted or substituted unsaturated heterocyclic ring, unsubstituted or substituted aromatic heterocyclic ring, unsubstituted or substituted alkylthio group, and a first polymer chain having a number average degree of polymerization in the range of 5 to 1000;

Z is selected from the group consisting of hydrogen, chlorine, unsubstituted or substituted C$_1$-C$_{18}$alkyl, unsubstituted or substituted aryl, unsubstituted or substituted C$_3$-C$_{18}$ heterocyclic ring, unsubstituted or substituted C$_1$-C$_{18}$ alkylthio, SR, unsubstituted or substituted arylthio, unsubstituted or substituted C$_1$-C$_{18}$ alkoxy, unsubstituted or substituted aryloxy, unsubstituted or substituted amino, unsubstituted or substituted C$_1$-C$_{18}$alkoxycarbonyl, unsubstituted or substituted aryloxycarbonyl, carboxy, unsubstituted or substituted C$_1$-C$_{18}$ acyloxy, unsubstituted or substituted aroyloxy, unsubstituted or substituted carbamoyl, cyano, C$_2$-C$_{18}$-dialkyl-phosphonato, diaryl-phosphonato, C$_1$-C$_{18}$dialkyl-phosphinato, diaryl-phosphinato and a second polymer chain having a number average degree of polymerization in the range of 5 to 1000;

R$^1$ is an n-valent moiety derived from R;

Z$^1$ is an m-valent moiety derived from a species selected from the group consisting of unsubstituted or substituted C$_1$-C$_{18}$ alkyl, unsubstituted or substituted aryl and a third polymer chain having a number average degree of polymerization in the range of 5 to 1000 wherein the connecting moieties in said polymer chain are selected from the group consisting of C$_1$-C$_{18}$-aliphatic carbon, aromatic carbon, oxygen, sulfur and a combination thereof;

P is an oligomer or polymer having a number average degree of polymerization in the range of 2 to 1000 or said first polymer chain;

X is selected from the group consisting of unsubstituted or substituted aryl, C$_1$-C$_{18}$-alkoxycarbonyl, unsubstituted or substituted aryloxycarbonyl, carboxy, unsubstituted or substituted aryloxycarbonyl, C$_1$ to C$_{18}$ carboxy, and cyano;

n and m are integers in the range of 1 to 6; and wherein the substituents for the substituted groups for R, R$^1$, Z, Z$^1$ and X are independently selected from the group consisting of hydroxy, tertiary amino, halogen, cyano, epoxy, carboxylic acid, alkoxy, alkyl having 1 to 32 carbon atoms, aryl, alkenyl having 2 to 32 carbon atoms, alkynyl having from 2 to 32 carbon atoms, saturated carbocyclic rings having 3 to 14 carbon atoms, unsaturated carbocyclic rings having 4 to 14 carbon atoms, aromatic carbocyclic rings having 6 to 14 carbon atoms, saturated heterocyclic rings having 3 to 14 carbon atoms, unsaturated heterocyclic rings having 3 to 14 carbon atoms and aromatic carbocyclic rings having 6 to 14 carbon atoms.

By a "polymer chain" referred to above for R, R$^1$, Z, Z$^1$ and P is meant conventional condensation polymers, such as polyesters [for example, polycaprolactone, poly(ethylene terephthalate), poly(lactic acid)], polycarbonates, poly(alkylene oxide)s [for example, poly(ethylene oxide) poly(tetramethylene oxide)], nylons, polyurethanes or chain polymers such as those formed by coordination polymerization (for example polyethylene, polypropylene), radical polymerization (for example, poly(meth)acrylates and polystyrenics, anionic polymerization (for example, polystyrene, polybutadiene), cationic polymerization (for example, polyisobutylene) and group transfer polymerization (for example, poly(meth)acrylates).

The groups R, R$^1$, Z and Z$^1$ are preferably chosen so as to be appropriate for use with the desired monomers or monomer combination and the polymerization method as disclosed in WO-A-98/01478, WO-A-99/05099 and WO-A-99/31144, all of which are incorporated herein by reference.

The synthesis of block copolymers by RAFT polymerization can be carried out in emulsion, solution or suspension in either a batch, semi-batch, continuous, or feed mode. For lowest polydispersity block copolymers, the RAFT agent is typically added before polymerization is commenced. For example, when carried out in a batch mode in solution, the reactor is typically charged with a RAFT agent and a monomer, or a polymerization medium plus the monomer. Block copolymers with broader, yet controlled, polydispersity or with multimodal molecular weight distribution can be produced by controlled addition of the RAFT agent over the course of the polymerization process.

In the case of emulsion or suspension polymerization, the polymerization medium will often be predominantly water and the conventional stabilizers, dispersants and other additives can be present.

For solution polymerization, the polymerization medium can be chosen from a wide range of media to suit the monomer(s) being used. For example, aromatic hydrocarbons, such as, petroleum naphtha or xylenes; ketones, such as, methyl amyl ketone, methyl isobutyl ketone, methyl ethyl ketone or acetone; esters, such as, butyl acetate or hexyl acetate; and glycol ether esters, such as, propylene glycol monomethyl ether acetate.

The use of feed polymerization conditions allows the use of RAFT agents with lower chain transfer constants and allows the synthesis of block copolymers that are not readily achieved using batch polymerization processes. If the RAFT polymerization is carried out as a feed system, the reaction can be carried out as follows:

The reactor is charged with the chosen polymerization medium, the RAFT agent and optionally a portion of the monomer mixture. Into a separate vessel is placed the remaining monomer mixture. The free radical initiator is dissolved or suspended in polymerization medium in another separate vessel. The medium in the reactor is heated and stirred while the monomer mixture plus the medium and the initiator plus the medium, is introduced, for example by a syringe pump or other pumping device. The rate and duration of feed is largely determined by the quantity of the solution, the desired monomer/RAFT agent/initiator ratio and the rate of the polymerization. When the feed is complete, heating may be continued for an additional period.

Following completion of the polymerization, the block copolymer can be isolated by stripping off the medium and unreacted monomer(s) or by precipitation with a non-solvent. Alternatively, the polymer solution/emulsion can be used as such, if appropriate to its application.

Block and multi-block and gradient copolymers may be prepared by varying the rate of monomer(s) addition and/or by varying the sequence in which the monomer(s) may be added to the polymerization medium. Gradient block may also be prepared in a one-step process by making use of the inherent difference in reactivity of the monomer(s). For gradient block copolymers, it is often desirable to pick comonomers with disparate reactivity ratios. For example, maleic anhydride and styrene or (meth)acrylates.

By appropriate selection of the groups R, $R^1$, Z, $Z^1$, P and X of the RAFT chain transfer agent of formulae I-IV above, block copolymers with specific end functionalities can be readily produced. Block copolymer may be prepared by starting with an existent polymer chain prepared by means other than RAFT polymerization and then modifying the end or other functionality such that the polymer chain is incorporated in a compound of formulae I-IV so as to create a macromolecular RAFT agent that can be chain extended by RAFT polymerization.

The "source of free radicals" or "initiator" suitable for use in the present invention includes those compounds that provide initiating radicals that add to monomers to produce propagating radicals.

The amount of initiator used depends upon the desired polydispersity, molecular weight and polymer structure of the resulting polymer. However, generally less than 10 weight percent based on the total amount of monomer mixture is used. Preferably the amount of initiator used is in the range of 0.001 to 5.0 weight percent.

The source of initiating radicals includes such sources as the thermally induced homolytic scission of a suitable initiator, such as peroxides, peroxyesters, or azo compounds; the spontaneous generation from monomer, such as styrene; redox initiating systems; photochemical initiating systems or high energy radiation source, such as electron beam, X- or γ-radiation or a combination of these methods. The initiating system is chosen such that under the reaction conditions there is substantially no adverse interaction of the initiator or the initiating radicals with the RAFT agent under the reaction conditions. The initiator should also have the requisite solubility in the reaction medium or the monomer mixture.

Examples of suitable sources of free radicals for the process include azo compounds and peroxides such as for example 2,2'-azobis(isobutyronitrile), 2,2'-azobis(2-cyano-2-butane), dimethyl 2,2'-azobis(methyl isobutyrate), 4,4'-azobis(4-cyanopentanoic acid), 4,4'-azobis(4-cyanopentan-1-ol), 1,1'-azobis(cyclohexanecarbonitrile), 2-(t-butylazo)-2-cyanopropane, 2,2'-azobis[2-methyl-N-(1,1)-bis(hydoxymethyl)-2-hydroxyethyl]propionamide, 2,2'-azobis[2-methyl-N-hydroxyethyl)]-propionamide, 2,2'-azobis(N, N'-dimethyleneisobutyramidine) dihydrochloride, 2,2'-azobis(2-amidinopropane) dihydrochloride, 2,2'-azobis(N, N'-dimethylene-isobutyramine), 2,2'-azobis(2-methyl-N-[1, 1-bis(hydroxymethyl)-2-hydroxyethyl]propionamide), 2,2'-azobis(2-methyl-N-[1,1-bis(hydroxymethyl)ethyl] propionamide), 2,2'-azobis[2-methyl-N-(2-hydroxyethyl) propionamide], 2,2'-azobis(isobutyramide)dihydrate, 2,2'-azobis-(2,2,4-trimethylpentane), 2,2'-azobis(2-methylpropane), tert-butyl peroxyacetate, tert-butyl peroxybenzoate, t-butyl peroxyoctoate, tert-butyl peroxyneodecanoate, tert-butylperoxy isobutyrate, tert-amyl peroxypivalate, tert-butyl peroxypivalate, di-isopropyl peroxydicarbonate, dicyclohexyl peroxydicarbonate, dicumyl peroxide, dibenzoyl peroxide, dilauroyl peroxide, potassium peroxydisulfate, ammonium peroxydisulfate, di-t-butyl hyponitrite, or dicumyl hyponitrite.

Photochemical initiator systems are chosen to have the requisite solubility in the reaction medium or monomer mixture and have an appropriate quantum yield for radical production under the conditions of the polymerization. Examples include benzoin derivatives, benzophenone, acyl phosphine oxides, and photo-redox systems. Free radicals may also be derived by direct photolysis of the compound of formula I-III.

Redox initiator systems are chosen to have the requisite solubility in the reaction medium or monomer mixture and have an appropriate rate of radical production under the conditions of the polymerization; these initiating systems can include combinations of the following oxidants and reductants: Oxidants: potassium peroxydisulfate, hydrogen peroxide, and tert-butyl hydroperoxide. Reductants: iron (II), titanium (III), potassium thiosulfite, and potassium bisulfite.

Other suitable initiating systems are described in recent texts. See, for example, Moad and Solomon "The Chemistry of Free Radical Polymerization", Pergamon, London, 1995, pp 53-95.

Compositions which are of interest include those comprising as component (c) a block or comb copolymer having at least one day compatible block and at least one matrix polymer compatible block prepared by controlled free radical polymerization.

Preferably, a day compatible block is based on hydrophilic or "clayophilic" monomers which contain polar groups such as for example ether [—O—], amide

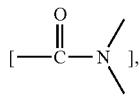

thioamide

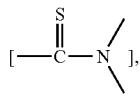

nitrile, anhydride, hydroxy, amine, pyridine, ammonium and phosphonium in appropriate proximity.

Preferred hydrophilic or "clayophilic" monomers are for example PEO acrylate, 1-vinyl-2-pyrrolidinone, N,N-dimethyl acrylamide, acrylonitrile, maleic anhydride, hydroxyethyl acrylate, hydroxypropyl acrylate, tert-butyl α-hydroxymethacrylate, N,N'-dimethylaminoethyl acrylate, 4-vinylbenzyldihydroxyethylamine, 4-vinylpyridine or 4-vinylbenzyltributylphosphonium chloride.

The molecular weight of the acrylic copolymer is preferably between 1000 and 100000 and the polydispersity between 1.05 and 3.0. More preferably the molecular weight is between 2000 and 20000 and the polydispersity is between 1.05 and 2.0.

Copolymers of the above polymers with other monomers may also be used.

The polar (hydrophilic) or "clayophilic" segments may also be derived from a polar condensation or other polymers such as for example poly(ethylene oxide).

Preference is given therefore to compositions comprising as component (c) a block or comb acrylic copolymer prepared by controlled free radical polymerization.

The block or comb copolymers prepared by controlled free radical polymerization can also be described as polymeric dispersing or solvating agents having amphiphilic properties. They have polar and nonpolar groups in the same molecule and they are, for example, dispersing or solvating agents based on polyethylene glycols (PEG), polyacrylates, polysiloxanes, polyvinyl acetate or on block copolymers containing at least one block copolymer based on acrylate, acrylic acid or methacrylate.

Block copolymers are, for example, diblock copolymers (A-B type) or triblock copolymers (A-B-A or A-B-C type) and so-called tapered structures.

Diblock copolymers (A-B type) are, for example, poly(styrene-b-methylmethacrylate), poly(styrene-b-tert-butylmethacrylate), poly(styrene-b-methylacrylate), poly(styrene-b-n-butylacrylate), poly(styrene-b-tert-butylacrylate), poly(styrene-b-butadiene), poly(styrene-b-isoprene[1,4-addition]), tapered block copolymer poly(styrene-b-butadiene), tapered block copolymer poly(styrene-b-ethylene), poly(styrene-b-2-vinylpyridine), poly(styrene-b-4-vinylpyridine), poly(styrene-bis-tert-butylstyrene), poly(styrene-b-dimethylsiloxane), poly(butadiene-b-dimethylsiloxane), poly(butadiene[1,4-addition]-b-methylmethacrylate), poly(isoprene[1-4-additon]-b-methylmethacrylate), poly(butadiene-b-tert-butylmethacrylate), poly(butadiene-b-tert-butylacrylate), poly(isoprene-b-2-vinylpyridine), poly(butadiene-b-4-vinylpyridine), poly(styrene-b-methyl methacrylate), poly(methyl methacrylate-b-tert-butyl methacrylate), poly(methyl methacrylate-b-tert-butyl acrylate), poly(tert-butyl acrylate-b-methyl metacrylate), poly(n-butylacrylate-b-methylmethacrylate), poly(2-vinylpyridine-b-methyl methacrylate), poly(tert-butyl methacrylate-b-tert-butyl acrylate), poly(tert-butyl methacrylate-b-2-vinylpyridine), poly(tert-butyl methacrylate-b-4-vinylpyridine), poly(tert-butyl acrylate-b-2-vinylpyridine), poly(2-vinylpyridine-b-4-vinylpyridine), poly(ethylene-b-methyl methacrylate), poly(ethylene-b-2-vinylpyridine) or poly(ethylene-b-4-vinylpyridine).

Triblock copolymers of the A-B-A type are, for example, poly(methyl methacrylate-b-styrene-b-methyl methacrylate), poly(tert-butyl methacrylate-b-styrene-b-tert-butyl methacrylate), poly(tert-butylacrylate-b-styrene-b-tert-butylacrylate), poly(2-vinylpyridine-b-styrene-b-tert-butyl acrylate), poly(4-vinylpyridine-b-styrene-b-4-vinylpyridine), poly(butadiene[1,2-additon]-b-styrene-b-butadiene[1,2-addition]), poly(butadiene[1,4-addition]b-styrene-b-butadiene[1,4-additon]), poly(styrene-b-butadiene[1,4- and 1,2-addition]-b-styrene), poly(methyl methacrylate-b-butadiene[1,4- or 1,2-addition]-b-methyl methacrylate), poly(tert-butyl methacrylate-b-methyl methacrylate-b-tert-butyl methacrylate), poly(tert-butyl acrylate-b-methyl methacrylate-b-tert-butyl acrylate), poly(methyl methacrylate-b-2-vinylpyridine-b-methyl methacrylate), poly(4-vinylpyridine-b-methyl methacrylate-b-4-vinylpyridine), poly(methyl methacrylate-b-tert-butyl acrylate-b-methyl methacrylate), poly(methyl methacrylate-b-n-butyl acrylate-b-methyl methacrylate), poly(tert-butyl methacrylate-b-tert-butyl acrylate-b-tert-butyl methacrylate), poly(2-vinylpyridine-b-tert-butyl acrylate-b-2-vinylpyridine), poly(4-vinylpyridine-b-tert-butyl acrylate-b-4-vinylpyridine), poly(styrene-b-n-butyl acrylate-b-styrene), poly(styrene-b-ethyl acrylate-b-styrene), poly(styrene-b-ethylene-b-styrene), poly(styrene-b-butylene-b-styrene), poly(ethylene oxide-b-styrene-b-ethylene oxide), poly(styrene-b-ethylene oxide-b-styrene) or poly(styrene-b-acrylic acid-b-styrene).

Triblock copolymers of the A-B-C type are, for example, poly(styrene-b-butadiene-b-2-vinylpyridine), poly(styrene-b-butadiene-b-4-vinylpyridine), poly(styrene-b-tert-butyl methacrylate-b-2-vinylpyridine), poly(styrene-b-tert-butyl-methacrylate-b-4-vinylpyridine), poly(styrene-b-2-vinylpyridine-b-4-vinylpyridine), poly(butadiene-b-styrene-b-methyl methacrylate), poly(styrene-b-butadiene-b-methyl methacrylate), poly(styrene-b-2-vinylpyridine-b-ethyl oxide), poly(styrene-b-tert-butyl acrylate-b-methyl methacrylate), poly(styrene-b-acrylic acid-b-methyl methacrylate), poly(styrene-b-a-methylstyrene-b-methyl methacrylate) or poly(styrene-b-a-methylstyrene-b-tert-butyl acrylate).

Particularly suitable dispersing or solvating agents having amphiphilic properties are, for example, poly(butadiene-b-methyl methacrylate), poly(isoprene-b-methylmethacrylate), poly(ethylene-b-methyl methacrylate), poly(styrene-b-4-vinylpyridine), poly(styrene-2-b-vinylpyridine), poly(styrene-b-n-butyl acrylate), poly(styrene-b-tert-butyl acrylate), poly(styrene-b-sodium acrylate), poly(styrene-b-acrylic acid), poly(methyl methacrylate-b-sodium acrylate), poly(methyl methacrylate-b-sodium methacrylate), poly(ethylene oxide-b-ε-caprolactone), poly(2-vinylpyridine-b-ethylene oxide), poly(butadiene-b-ethylene oxide), poly(butadiene-b-sodium acrylate), poly(ethylene-b-ethylene oxide), poly(ethylene-b-propylene oxide), poly(styrene-b-ethylacrylate-b-styrene), poly(ethylene oxide-b-styrene-b-ethylene oxide), poly(styrene-b-acrylic acid-styrene), poly(styrene-b-butadiene-b-methyl methacrylate), poly(styrene-b-vinylpyridine-b-ethylene oxide), poly(styrene-b-4-vinylbenzoic acid), poly(styrene-b-polyglycidyl-methacrylate), poly(ethylene-b-glycidyl methacrylate), poly(propylene-b-acrylic acid), poly(ethylene-b-acrylic acid), poly(propylene-b-maleic anhydride), poly(ethylene-b-maleic anhydride), poly(styrene-b-maleic anhydride), poly(methacrylic acid)-poly(alkylene oxide) block copolymers, for example according to EP-A-0 859 028, polysiloxane-polyoxy-alkylene, copolymers of maleates and styrene or styrene derivatives, for example according to EP-A-0 791 024, polystyrene-polysiloxane block copolymers, polyacrylate-polysiloxane block copolymers and cyclosiloxane-radiale copolymers, prepared e.g. using ATRP technology according to EP-A-0 870 774, methylacrylate-styrene copolymer, methylmethacrylate-styrene, polybutadiene-methylacrylates, prepared by nitroxyl-initiated radical polymerisation according to EP-A-0 135 280.

The polyalkylene oxides are preferably polyethylene oxide, polypropylene oxide and polybutylene oxide.

Suitable block copolymers are, for example, polyacrylate/polystyrene, polymethacrylate/polyethylene oxide, polyacrylate/polyethylene oxide, polyacrylate/polyethylene, polyvinyl acetate/polyethylene, polystyrene/polybutadiene, polyacrylate/polybutadiene, polyacrylate/polyisoprene, polyisoprene/polymethylmethacrylate, polyethylene/polymethylmethacrylate, polyethylene/polyethylene oxide or polyethylene/polypropylene oxide.

Particularly suitable dispersing or solvating agents having amphiphilic-properties are, for example, poly(styrene-bis-sodium acrylate), poly(styrene-bis-acrylic acid), poly(styrene-bis-sodium methacrylate), poly(styrene-bis-N-methyl-4-vinylpyridinium iodide), poly(isoprene-bis-N-methyl-2-vinylpyridinium iodide), poly(styrene-bis-ethylene oxide) poly(methylmethacrylate-bis-sodium acrylate), poly(methylmethacrylate-bis-sodium methacrylate), poly(methylmethacrylate-bis-ethylene oxide), poly(tert-butylmethacrylate-bis-ethylene oxide), poly(methylmethacrylate-bis-N-methyl-4-vinylpyridinium iodide), poly(ethylene oxide-bis-lactate), poly(2-vinylpyridine-bis-ethylene oxide), poly(butadiene-bis-sodium acrylate), poly(butadiene-bis-sodium methacrylate), poly(butadiene-bis-N-methyl-4-vinylpyridinium iodide), poly(butadiene-bis-ethylene oxide), poly(ethylene-bis-ethylene oxide) or poly(ethylene-bis-propylene oxide).

Other likewise preferred dispersing or solvating agents based on polyacrylates are described, inter alia, in U.S. Pat. No. 5,133,898.

Preferably, component (b) is present in the composition in an amount of from 0.1 to 40%, more preferably 0.5 to 20%, most preferably from 1 to 10%, based on the weight of the synthetic polymer [component (a)].

Preferably, component (c) is present in the composition in an amount of from 0.1 to 20%, more preferably 0.1 to 15%, most preferably from 0.1 to 10%, based on the weight of the synthetic polymer [component (a)].

In addition to components (a), (b) and (c) the novel compositions may comprise further additives, such as, for example, the following:

1. Antioxidants 1.1. Alkylated monophenols, for example 2,6-di-tert-butyl-4-methylphenol, 2-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(αmethylcyclohexyl)4,6-di-methylphenol, 2,6-dioctadecyl-4-methylphenol, 2,4,6-tricyclohexylphenol, 2,6-di-tert-butyl-4-methoxymethylphenol, linear nonylphenols or nonylphenols branched in the side-chain, e.g. 2,6-dinonyl-4-methylphenol, 2,4-dimethyl-6(1'-methylundec-1'-yl)-phenol, 2,4-dimethyl-6-1'-methylheptadec-1'-yl)-phenol, 2,4-dimethyl-6-(1'-methyltridec-1-yl)-phenol and mixtures thereof.

1.2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-didodecylthiomethyl-4-nonylphenol.

1.3. Hydroquinones and alkylated hydroquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis(3,5-di-tert-butyl-4-hydroxyphenyl) adipate.

1.4. Tocopherols, for example α-tocopherol, β-tocopherol, γ-tocopherol, δ-tocopherol and mixtures thereof (Vitamin E).

1.5. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis(3,6-di-sec-amylphenol), 4,4'-bis(2,6-dimethyl-4-hydroxyphenyl)disulfide.

1.6. Alkylidene bisphenols, for example 2,2'-methylenebis(6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5-tert-butyl-4-hydroxy-2-methylphenyl)butane, 2,6-bis(3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methylphenyl)-3-n-dodecylmercaptobutane, ethylene glycol bis[3,3-bis(3'-tert-butyl-4'-hydroxyphenyl)butyrate], bis(3-tert-buty-4-hydroxy-5-methylphenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis(3,5-di-tert-butyl-4-hydroxyphenyl)propane, 2,2-bis(5-tert-butyl-4-hydroxy-2-methylphenyl)-4-n-dodecylmercaptobutane, 1,1,5,5-tetra(5-tert-butyl-4-hydroxy-2-methylphenyl)pentane.

1.7. O-, N- and S-benzyl compounds, for example 3,5,3',5'-tetra-tert-butyl-4,4'-dihydroxydibenzyl ether, octadecyl-4-hydroxy-3,5-dimethylbenzyl mercaptoacetate, tridecyl-4-hydroxy-3,5-di-tert-butylbenzyl mercaptoacetate, tris(3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl) sulfide, isooctyl-3,5-di-tert-butyl-4-hydroxybenzyl mercaptoacetate.

1.8. Hydroxybenzylated malonates, for example dioctadecyl 2,2-bis(3,5-di-tert-butyl-2-hydroxybenzyl)malonate, dioctadecyl 2-(3-tert-butyl-4-hydroxy-5-methylbenzyl)malonate, didodecylmercaptoethyl 2,2-bis(3,5-di-tert-butyl-4-hydroxybenzyl)malonate, di-[4-(1,1,3,3-tetramethylbutyl)phenyl] 2,2-bis(3,5-di-tert-butyl-4-hydroxybenzyl)malonate.

1.9. Hydroxybenzyl aromatic compounds, for example 1,3,5-tris(3,5-di-tert-butyl-4-hydroxybenzyl)-2,4,6-trimethylbenzene, 1,4-bis(3,5-di-tert-butyl-4-hydroxybenzyl)-2,3,5,6-tetra-methylbenzene, 2,4,6-tris(3,5-di-tert-butyl-4-hydroxybenzyl)phenol.

1.10. Triazine compounds, for example 2,4-bisoctylmercapto-6-(3,5-di-tert-butyl-4-hydroxy-anilino)-1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris(3,5-di-tert-butyl-4-hydroxybenzyl) isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)hexahydro-1,3,5-triazine, 1,3,5-tris(3,5-dicyclohexyl-4-hydroxybenzyl) isocyanurate.

1.11. Benzylphosphonates, for example dimethyl 2,5-di-tert-butyl-4-hydroxybenzylphosphonate, diethyl 3,5-di-tert-butyl-4-hydroxybenzylphosphonate, dioctadecyl 3,5-di-tert-butyl-4-hydroxybenzylphosphonate, dioctadecyl 5-tert-butyl-4-hydroxy-3-methylbenzylphosphonate, calcium salt of 3,5-di-tert-butyl-4-hydroxybenzyl-phosphonic acid monoethyl ester.

1.12. Acylaminophenols, for example 4-hydroxylauric acid anilide, 4-hydroxystearic acid anilide, N-3,5-di-tert-butyl-4-hydroxyphenyl)carbamic acid octyl ester.

1.13. Esters of β-(3,5-di-tert-butyl-4-hydroxyphenyl)propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.14. Esters of β-(5-tert-butyl-4-hydroxy-3-methylphenyl) propionic acid with mono- or poly-hydric alcohols, for example with methanol, ethanol, n-octanol, isooctanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane; 3,9-bis[2-{3-(3-tert-butyl-4-hydroxy-5-methylphenyl)propionyloxy}-1,1-dimethylethyl]-2,4,8,10-tetraoxaspiro[5.5]undecane.

1.15. Esters of β-(3,5-dicyclohexyl-4-hydroxyphenyl)propionic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.16. Esters of 3,5-di-tert-butyl-4-hydroxyphenylacetic acid with mono- or poly-hydric alcohols, for example with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, peritaerythritol, tris(hydroxyethyl) isocyanurate, N,N'-bis(hydroxyethyl)oxalic acid diamide, 3-thiaundecanol, 3-thiapentadecanol, trimethylhexanediol, trimethylolpropane, 4-hydroxymethyl-1-phospha-2,6,7-trioxabicyclo[2.2.2]octane.

1.17. Amides of β-(3,5-di-tert-butyl-4-hydroxyphenyl)propionic acid, for example N,N'-bis(3,5-di-tert-butyl-4-hydroxyphenylpropionyl)hexamethylenediamide, N,N'-bis(3,5-di-tert-butyl-4-hydroxyphenylpropionyl)trimethylenediamide, N,N'-bis(3,5-di-tert-butyl-4-hydroxyphenylpropionyl)hydrazide), N,N'-bis[2-(3-[3,5-di-tert-butyl-4-hydroxyphenyl]propionyloxy)ethyl]oxamide (Naugard®XL-1 from Uniroyal).

1.18. Ascorbic acid (Vitamin C).

1.19. Amine-type antioxidants, for example N,N'-di-isopropyl-p-phenylenediamine, N,N'-di-sec-butyl-p-phenylenediamine, N,N'-bis(1,4-dimethylpentyl)-p-phenylenediamine, N,N'-bis(1-ethyl-3-methylpentyl)-p-phenylenediamine, N,N'-bis(1-methylheptyl)-p-phenylenediamine, N,N'-dicyclohexyl-p-phenylenediamine, N,N'-diphenyl-p-phenylenediamine, N,N'-di(2-naphthyl)-p-phenylenediamine, N-isopropyl-N'-phenyl-p-phenylenediamine, N-(1,3-dimethylbutyl)-N'-phenyl-p-phenylenediamine, N-(1-methylheptyl)-N'-phenyl-p-phenylenediamine, N-cyclohexyl-N'-phenyl-p-phenylenediamine, 4-(p-toluenesulfonamido)-diphenylamine, N,N'-dimethyl-N,N'-di-sec-butyl-p-phenylenediamine, diphenylamine, N-allyldiphenylamine, 4-isopropoxydiphenylamine, N-phenyl-1-naphthylamine, N-(4-tert-octylphenyl)-1-naphthylamine, N-phenyl-2-naphthylamine, octylated diphenylamine, for example p,p'-di-tert-octyldiphenylamine, 4-n-butylaminophenol, 4-butyrylaminophenol, 4-nonanoylaminophenol, 4-dodecanoylaminophenol, 4-octadecanoylaminophenol, di(4-methoxyphenyl)amine, 2,6-di-tert-butyl-4-dimethylaminomethylphenol, 2,4'-diaminodiphenylmethane, 4,4'-diaminodiphenylmethane, N,N,N',N'-tetramethyl-4,4'-diaminodiphenylmethane, 1,2-di[(2-methylphenyl)amino]ethane, 1,2-di(phenylamino)propane, (o-tolyl)biguanide, di[4-(1',3'-dimethylbutyl)phenyl]amine, tert-octylated N-phenyl-1-naphthylamine, mixture of mono- and di-alkylated tert-butyl-tert-octyl-diphenylamines, mixture of mono- and di-alkylated nonyl-diphenylamines, mixture of mono- and di-alkylated dodecyldiphenylamines, mixture of mono- and di-alkylated isopropyl-/isohexyl-diphenylamines, mixtures of mono- and di-alkylated tert-butyldiphlenylamines, 2,3-dihydro-3,3-dimethyl-4H-1,4-benzothiazine, phenothiazine, mixture of mono- and -di-akylated tert-butyl-/tert-octyl-phenothiazines, mixture of mono- and di-alkylated tert-octylphenothiazines, N-allylphenothiazine or N,N,N'N'-tepraphenyl-1,4-diaminobut-2-ene.

2. UV absorbers and light stabilizers 2.1. 2-(2'-Hydroxyphenyl)-benzotriazoles, for example 2-(2'-hydroxy-5'-methylphenyl)-benzotriazole, 2-(3',5'-di-tert-butyl-2'-hydroxyphenyl)-benzotriazole, 2-(5'-tert-butyl-2'-hydroxyphenyl)-benzotriazole, 2-(2'-hydroxy-5'-(1,1,3,3-tetramethylbutyl)-phenyl)-benzotriazole, 2-(3',5'-di-tert-butyl-2'-hydroxyphenyl)-5-chlorobenzotriazole, 2-(3'-tert-butyl-2'-hydroxy-5'-methylphenyl)-5-chlorobenzotriazole, 2-(3'-sec-butyl-5'-tert-butyl-2'-hydroxyphenyl)-benzotriazole, 2-(2'-hydroxy-4'-octyloxyphenyl)-benzotriazole, 2-(3',5'-di-tert-amyl-2'-hydroxyphenyl)-benzotriazole, 2-(3',5'-bis(α,α-dimethylbenzyl)-2'-hydroxyphenyl)-benzotriazole, 2-(3'-tert-butyl-2'-hydroxy-5'-(2-octyloxycarbonylethyl)

phenyl)-5-chlorobenzotriazole, 2-(3'-tert-butyl-5'-[2-(2-ethylhexyloxy)carbonylethyl]-2'-hydroxyphenyl)-5-chlorobenzotriazole, 2-(3'-tert-butyl-2'-hydroxy-5'-(2-methoxycarbonylethyl)phenyl)-5-chlorobenzotriazole, 2-(3'-tert-butyl-2'-hydroxy-5'-(2-methoxycarbonylethyl) phenyl)-benzotriazole, 2-(3'-tert-butyl-2'-hydroxy-5'-(2-octyloxycarbonylethyl)phenyl)-benzotriazole, 2-(3'-tert-butyl-5'-[2-(2-ethylhexyl-oxy)carbonylethyl]-2'-hydroxyphenyl)-benzotriazole, 2-(3'-dodecyl-2'-hydroxy-5'-methyl-phenyl)-benzotriazole, 2-(3'-tert-butyl-2'-hydroxy-5'-(2-isooctyloxycarbonylethyl)-phenyl-benzotriazole, 2,2'-methylenebis[4-(1,1,3,3-tetramethylbutyl-6-benzotriazol-2-yl-phenol]; transesterification product of 2-[3'-tert-butyl-5'-(2-methoxycarbonylethyl)-2'-hydroxyphenyl]-benzotriazole with polyethylene glycol 300; [R—CH$_2$CH$_2$—COO—CH$_2$CH$_2$—]$_2$ wherein R=3'-tert-butyl-4'-hydroxy-5'-2H-benzotriazol-2-yl-phenyl; 2-[2'-hydroxy-3'-(α,α-dimethylbenzyl)-5'-(1,1,3,3-tetramethylbutyl)-phenyl]-benzotriazole; 2-[2'-hydroxy-3'-(1,1,3,3-tetramethylbutyl)-5'-(α,α-dimethylbenzyl)-phenyl]-benzotriazole.

2.2. 2-Hydroxybenzophenones, for example the 4-hydroxy, 4-methoxy, 4-octyloxy, 4-decyloxy, 4-dodecyloxy, 4-benzyloxy, 4,2',4'-trihydroxy or 2'-hydroxy-4,4'-dimethoxy derivative.

2.3. Esters of unsubstituted or substituted benzoic acids, for example 4-tert-butyl-phenyl salicylate, phenyl salicylate, octylphenyl salicylate, dibenzoylresorcinol, bis(4-tert-butylbenzoyl)resorcinol, benzoylresorcinol, 3,5-di-tert-butyl-4-hydroxybenzoic acid 2,4-di-tert-butylphenyl ester, 3,5-di-tert-butyl-4-hydroxybenzoic acid hexadecyl ester, 3,5-di-tert-butyl-4-hydroxybenzoic acid octadecyl ester, 3,5-di-tert-butyl-4-hydroxybenzoic acid 2-methyl-4,6-di-tert-butylphenyl ester.

2.4. Acrylates, for example α-cyano-β,βdiphenylacrylic acid ethyl ester or isooctyl ester, α-methoxycarbonylcinnamic acid methyl ester, α-cyano-β-methyl-p-methoxycinnamic acid methyl ester or butyl ester, α-methoxycarbonyl-p-methoxycinnamic acid methyl ester, N-(β-methoxycarbonyl-β-cyanovinyl)-2-methyl-indoline.

2.5. Nickel compounds, for example nickel complexes of 2,2'-thio-bis[4-1,1,3,3-tetra-methylbutyl)phenol], such as the 1:1 or 1:2 complex, optionally with additional ligands, such as n-butylamine, triethanolamine or N-cyclohexyldiethanolamine, nickel dibutyl dithiocarbamate, nickel salts of 4-hydroxy-3,5-di-tert-butylbenzylphosphonic acid monoalkyl esters, such as of the methyl or ethyl ester, nickel complexes of ketoximes, such as of 2-hydroxy-4-methylphenylundecyl ketoxime, nickel complexes of 1-phenyl-4-lauroyl-5-hydroxypyrazole, optionally with additional ligands.

2.6. Sterically hindered amines, for example bis(2,2,6,6-tetramethylpiperid-4-yl) sebacate, bis(2,2,6,6-tetramethylpiperid-4-yl) succinate, bis(1,2,2,6,6-pentamethylpiperid-4-yl) sebacate, bis(1-octyloxy-2,2,6,6-tetramethylpiperid-4-yl) sebacate, n-butyl-3,5-di-tert-butyl-4-hydroxybenzylmalonic acid bis(1,2,2,6,6-pentamethylpiperidyl) ester, condensation product of 1-hydroxyethyl-2,2,6,6-tetramethyl-4-hydroxypiperidine and succinic acid, linear or cyclic condensation products of N,N'-bis(2,2,6,6-tetramethyl-4-piperidyl)hexamethylenediamine and 4-tert-octylamino-2,6-dichloro-1,3,5-s-triazine, tris(2,2,6,6-tetramethyl-4-piperidyl) nitrilotriacetate, tetrakis(2,2,6,6-tetramethyl-4-piperidyl)-1,2,3,4-butanetetraoate, 1,1'-(1,2-ethane-diyl)bis(3,3,5,5-tetramethylpiperazinone), 4-benzoyl-2,2,6,6-tetramethylpiperidine, 4-stearyloxy-2,2,6,6-tetramethylpiperidine, bis(1,2,2,6,6-pentamethylpiperidyl)-2-n-butyl-2-(2-hydroxy-3,5-di-tert-butylbenzyl) malonate, 3-n-octyl-7,7,9,9-tetramethyl-1,3,8-triazaspiro[4.5]decane-2,4-dione, bis(1-octyloxy-2,2,6,6-tetramethylpiperidyl) sebacate, bis(1-octyloxy-2,2,6,6-tetra-methylpiperidyl) succinate, linear or cyclic condensation products of N,N'bis(2,2,6,6-tetra-methyl-4-piperidyl)hexamethylenediamine and 4-morpholino-2,6-dichloro-1,3,5-triazine, condensation product of 2-chloro-4,6-di(4-n-butylamino-2,2,6,6-tetramethylpiperidyl)-1,3,5-triazine and 1,2-bis(3-aminopropylamino)ethane, condensation product of 2-chloro-4,6-di(4-n-butylamino-1,2,2,6,6-pentamethylpiperidyl)-1,3,5-triazine and 1,2-bis(3-aminopropylamino)-ethane, 8-acetyl-3-dodecyl-7,7,9,9-tetramethyl-1,3,8-triazaspiro[4.5]decane-2,4-dione, 3-dodecyl-1-(2,2,6,6-tetramethyl-4-piperidyl)pyrrolidine-2,5-dione, 3-dodecyl-1-(1,2,2,6,6-pentamethyl-4-piperidyl)pyrrolidine-2,5-dione, mixture of 4-hexadecyloxy- and 4-stearyloxy-2,2,6,6-tetramethylpiperidine, condensation product of N,N'bis(2,2,6,6-tetramethyl-4-piperidyl)hexamethylenediamine and 4-cyclohexylamino-2,6-dichloro-1,3,5-triazine, condensation product of 1,2-bis(3-aminopropylamino)ethane and 2,4,6-trichloro-1,3,5-triazine and 4-butyl-amino-2,2,6,6-tetramethylpiperidine (CAS Reg. No. [136504-96-6]); condensation product of 1,6-diaminohexane and 2,4,6-trichloro-1,3,5-triazine and also N,N-dibutylamine and 4-butyl-amino-2,2,6,6-tetramethylpiperidine (CAS Reg. No. [192268-64-7]); N-2,2,6,6-tetramethyl-4-piperidyl)-n-dodecylsuccinimide, N-(1,2,2,6,6-pentamethyl-4-piperidyl)-n-dodecylsuccinimide, 2-undecyl-7,7,9,9-tetramethyl-1-oxa-3,8-diaza-4-oxo-spiro[4.5]decane, reaction product of 7,7,9,9-tetramethyl-2-cycloundecyl-1-oxa-3,8-diaza-4-oxospiro[4.5]decane and epichlorohydrin, 1,1-bis(1,2,2,6,6-pentamethyl-4-piperidyloxycarbonyl)-2-(4-methoxyphenyl)ethene, N,N'-bis-formyl-N,N'-bis(2,2,6,6-tetramethyl-4-piperidyl)hexamethylenediamine, diester of 4-methoxymethylenemalonic acid with 1,2,2,6,6-pentamethyl-4-hydroxypiperidine, poly[methylpropyl-3-oxy-4-(2,2,6,6-tetramethyl-4-piperidyl)]siloxane, reaction product of maleic anhydride α-olefin copolymer and 2,2,6,6-tetramethyl-4-aminopiperidine or 1,2,2,6,6-pentamethyl-4-aminopiperidine.

2.7. Oxalic acid diamides, for example 4,4'-dioctyloxy oxanilide, 2,2'-diethoxy oxanilide, 2,2'-dioctyloxy-5,5'-di-tert-butyl oxanilide, 2,2'-didodecyloxy-5,5'-di-tert-butyl oxanilide, 2-ethoxy-2'-ethyl oxanilide, N,N'-bis(3-dimethylaminopropyl) oxalamide, 2-ethoxy-5-tert-butyl-2'-ethyl oxanilide and a mixture thereof with 2-ethoxy-2'-ethyl-5,4'-di-tert-butyl oxanilide, mixtures of o- and p-methoxy- and also of o- and p-ethoxy-di-substituted oxanilides.

2.8. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxypropyloxy)phenyl]-4,6-bis(2,4-dimethylphenyl)-1,3,5-triazine, 2-[2-hydroxy-4-(2-hydroxy-3-octyloxypropyloxy)phenyl]-4,6-bis(2,4-dimethylphenyl)-1,3,5-triazine, 2-[4-dodecyloxy/tridecyloxy-2-hydroxypropoxy)-2-hydroxyphenyl]4,6-bis(2,4-dimethylphenyl)-1,3,5-triazine, 2-[2-hydroxy-4-(2-hydroxy-3-dodecyloxypropoxy)phenyl]-4,6-bis(2,4-dimethylphenyl)

1,3,5-triazine, 2-(2-hydroxy-4-hexyloxy)phenyl-4,6-diphenyl-1,3,5-triazine, 2-(2-hydroxy-4-methoxyphenyl)-4,6-diphenyl-1,3,5-triazine, 2,4,6-tris[2-hydroxy-4-(3-butoxy-2-hydroxypropoxy)phenyl]-1,3,5-triazine, 2-(2-hydroxyphenyl)-4-(4-methoxyphenyl)-6-phenyl-1,3,5-triazine, 2-{2-hydroxy-4-[3-(2-ethylhexyl-1-oxy)-2-hydroxypropyloxy]phenyl}-4,6-bis(2,4-dimethylphenyl)-1,3,5-triazine.

3. Metal deactivators, for example N,N'-diphenyloxalic acid diamide, N-salicylal-N'-salicyloyl-hydrazine, N,N'-bis(salicyloyl)hydrazine, N,N'-bis(3,5-di-tert-butyl-4-hydroxyphenylpropionyl)-hydrazine, 3-salicyloylamino-1,2,4-triazole, bis(benzylidene)oxalic acid dihydrazide, oxanilide, isophthalic acid dihydrazide, sebacic acid bis-phenylhydrazide, N,N'-diacetyladipic acid dihydrazide, N,N'-bis-salicyloyloxalic acid dihydrazide, N,N'bis-salicyloylthiopropionic acid dihydrazide.

4. Phosphites and Phosphonites, e.g. triphenyl phosphite, diphenylalkyl phosphites, phenyl-dialkyl phosphites, tris(nonylphenyl)phosphite, trilauryl phosphite, trioctadecyl phosphite, distearyl-pentaerythritol diphosphite, tris(2,4-di-tert-butylphenyl)phosphite, diisodecylpenta-erythritol diphosphite, bis(2,4-di-tert-butylphenyl)pentaerythritol diphosphite, bis(2,4-di-cumylphenyl)-pentaefythritol diphosphite, bis(2,6-di-tert-butyl-4-methylphenyl)pentaerythritol diphosphite, bis-isodecyloxy-pentaerythritol diphosphite, bis(2,4-di-tert-butyl-6-methylphenyl)pentaerythritol diphosphite, bis(2,4,6-tri-tert-butylphenyl)pentaerythritol diphosphite, tristearyl sorbitol triphosphite, tetrakis(2,4-di-tert-butylphenyl)-4,4'-biphenylene diphosphonite, 6-isooctyloxy-2,4,8,10-tetra-tert-butyl-12H-dibenzo[d,g]-1,3,2-dioxaphosphocine, bis(2,4-di-tert-butyl-6-methylphenyl) methylphosphite, bis(2,4-di-tert-butyl-6-methyl-phenyl) ethylphosphite, 6-fluoro-2,4,8,10-tetra-tert-butyl-12-methyl-dibenzo[d,g]-1,3,2-dioxaphosphocine, 2,2',2"-nitrilo[triethyl-tris(3,3',5,5'-tetra-tert-butyl-1,1'-biphenyl-2,2'-diyl)-phosphite], 2-ethylhexyl-3,3',5,5'-tetra-tert-butyl-1,1'-biphenyl-2,2'-diyl) phosphite, 5-butyl-5-ethyl-2-(2,4,6-tri-tert-butylphenoxy)-1,3,2-dioxaphosphirane.

5. Hydroxylamines, for example N,N-dibenzylhydroxylamine, N,N-diethylhydroxylamine, N,N-dioctylhydroxylamine, N,N-dilaurylhydroxylamine, N,N-ditetradecylhydroxylamine, N,N-dihexadecyhydroxylamine, N,N-dioctadecylhydroxylamine, N-hexadecyl-N-octadecylhydroxylamine, N-heptadecyl-N-octadecylhydroxylamine, N,N-dialkylhydroxylamine from hydrogenated tallow fatty amines.

6. Nitrones, for example N-benzyl-alpha-phenylnitrone, N-ethyl-alpha-methylnitrone; N-octyl-alpha-heptylnitrone, N-lauryl-alpha-undecylnitrone, N-tetradecyl-alpha-tridecylnitrone, N-hexadecyl-alpha-pentadecylnitrone, N-octadecyl-alpha-heptadecylnitone, N-hexadecyl-alpha-heptadecylnitrone, N-octadecyl-alpha-pentadecylnitrone, N-heptadecyl-alpha-heptadecylnitrone, N-octadecyl-alpha-hexadecylnitrone, nitrones derived from N,N-dialkylhydroxylamines prepared from hydrogenated tallow fatty amines.

7. Thiosynergistic compounds, for example thiodipropionic acid dilauryl ester or thiodipropionic acid distearyl ester.

8. Peroxide-destroying compounds, for example esters of β-thio-dipropionic acid, for example the lauryl, stearyl, myristyl or tridecyl ester, mercaptobenzimidazole, the zinc salt of 2-mercaptobenzimidazole, zinc dibutyldithiocarbamate, dioctadecyldisulfide, pentaerythritol tetrakis(β-dodecylmercapto)propionate.

9. Polyamide stabilisers, for example copper salts in combination with iodides and/or phosphorus compounds and salts of divalent manganese.

10. Basic co-stabilisers, for example melamine, polyvinylpyrrolidone, dicyandiamide, triallyl cyanurate, urea derivatives, hydrazine derivatives, amines, polyamides, polyurethanes, alkali metal and alkaline earth metal salts of higher fatty acids, for example calcium stearate, zinc stearate, magnesium behenate, magnesium stearate, sodium ricinoleate, potassium palmitate, antimony pyrocatecholate or zinc pyrocatecholate.

11. Nucleating agents, for example inorganic substances, e.g. talc, metal oxides, such as titanium dioxide or magnesium oxide, phosphates, carbonates or sulfates of preferably alkaline earth metals; organic compounds, such as mono- or polycarboxylic acids and their salts, e.g. 4-tert-butylbenzoic acid, adipic acid, diphenylacetic acid, sodium succinate or sodium benzoate; polymeric compounds, for example ionic copolymerisates ("ionomers"). Special preference is given to 1,3:2,4-bis(3',4'-dimethylbenzylidene)sorbitol, 1,3:2,4-di(paramethyldibenzylidene)sorbitol and 1,3:2,4-di(benzylidene)sorbitol.

12. Fillers and reinforcing agents, for example calcium carbonate, silicates, glass fibres, glass beads, talc, Kaolin, mica, barium sulfate, metal oxides and hydroxides, carbon black, graphite, wood powders and fibres of other natural products, synthetic fibres.

13. Other additives, for example plasticisers, lubricants, emulsifiers, pigments, rheology additives, catalysts, flow improvers, optical brighteners, flame retardants, antistatics, blowing agents.

14. Benzofuranones and indolinones, for example as described in U.S. Pat. No. 4,325,863; U.S. Pat. No. 4,338,244; U.S. Pat. No. 5,175,312, U.S. Pat. No. 5,216,052; U.S. Pat. No. 5,252,643; DE-A-4 316 611; DE-A-4 316 622; DE-A-4 316 876; EP-A-0 589 839 or EP-A-0 591 102, or 3-[4-(2-acetoxyethoxy)phenyl]-5,7-di-tert-butyl-benzofuran-2-one, 5,7-di-tert-butyl-3-[4-(2-stearoyl-oxyethoxy)phenyl]benzofuran-2-one, 3,3'-bis[5,7-di-tert-butyl-3-(4-[2-hydroxyethoxy]phenyl)-benzofuran-2-one], 5,7-di-tert-butyl-3-(4-ethoxyphenyl)benzofuran-2-one, 3-(4-acetoxy-3,5-dimethylphenyl)-5,7-di-tert-butyl-benzofuran-2-one, 3-(3,5-dimethyl-4-pivaloyloxy-phenyl)-5,7-di-tert-butyl-benzofuran-2-one, 3-(3,4-dimethylphenyl)-5,7-di-tert-butyl-benzofuran-2-one, 3-(2,3-dimethylphenyl)-5,7-di-tert-butyl-benzofuran-2-one.

The costabilizers are added, for example, in concentrations of 0.01 to 10%, relative to the total weight of the synthetic polymer to be stabilized.

Preferred further additives are phenolic antioxidants, light-stabilizers, processing stabilizers, solvents, pigments, dyes, plasticizers, compatibilizers, toughening agents and/or thixotropic agents.

In addition to the nano fillers other fillers may be used as reinforcing agents (item 12 in the list), for example talc, calcium carbonate, hydrotalcite, mica, kaolin, metal hydroxides, especially aluminium hydroxide or magnesium hydroxide. These are added to the synthetic polymers in concentrations, for example, of from 0.01 to 40%, based on the overall weight of the synthetic polymers to be stabilized.

Carbon black as filler is added to the synthetic polymers in concentrations, judiciously, of from 0.01 to 5.%, based on the overall weight of the synthetic polymers to be stabilized.

Glass fibers as reinforcing agents are added to the synthetic polymers in concentrations, judiciously, or from 0.01 to 20%, based on the overall weight of the synthetic polymers to be stabilized.

Further preferred compositions comprise in addition to components (a), (b) and (c) further additives as well, especially alkaline earth metal salts of higher fatty acids, for example calcium stearate.

As a conventional stabilizer combination for processing synthetic polymers, for example polyolefins, to form corresponding mouldings, the combination of a phenolic antioxidant with a secondary antioxidant based on an organic phosphite or phosphonite is recommended.

Incorporation of components (b) and (c) and, if desired, further additives into the synthetic polymers is carried out by known methods, for example before or during moulding or else by applying the dissolved or dispersed compounds to the synthetic polymer, if appropriate with subsequent slow evaporation of the solvent The present invention also relates to a nanocomposite material in the form of a masterbatch or concentrate comprising component (a) in an amount of from 5 to 90%, component (b) in an amount of from 5 to 80%, and component (c) in an amount of from 0.5 to 50% by weight.

Components (b) and (c) and, if desired, further additives, can also be added before or during polymerisation or before crosslinking.

Components (b) and (c), with or without further additives, can be incorporated in pure form or encapsulated in waxes, oils or polymers into the synthetic polymer.

Components (b) and (c), with or without further additives, can also be sprayed onto the synthetic polymer. It is able to dilute other additives (for example the conventional additives indicated above) or their melts so that they too can be sprayed together with these additives onto the polymer. Addition by spraying on during the deactivation of the polymerization catalysts is particularly advantageous, it being possible to carry out spraying using, for example, the steam used for deactivation.

In the case of spherically polymerized polyolefins it may, for example, be advantageous to apply components (b) and (c), with or without other additives, by spraying.

The synthetic polymers prepared in this way can be employed in a wide variety of forms, for example as foams, films, fibres, tapes, moulding compositions, as profiles or as binders for coating materials, especially powder coatings, adhesives, putties or especially as thick-layer polyolefin mouldings which are in long-term contact with extractive media, such as, for example, pipes for liquids or gases, films, fibres, geomembranes, tapes, profiles or tanks.

The preferred thick-layer polyolefin mouldings have a layer thickness of from 1 to 50 mm, in particular from 1 to 30 mm, for example from 2 to 10 mm.

The compositions according to the invention can be advantageously used for the preparation of various shaped articles. Examples are:

I-1) Floating devices, marine applications, pontoons, buoys, plastic lumber for decks, piers, boats, kayaks, oars, and beach reinforcements.

I-2) Automotive applications, in particular bumpers, dashboards, battery, rear and front linings, moldings parts under the hood, hat shelf, trunk linings, interior linings, air bag covers, electronic moldings for fittings (lights), panes for dashboards, headlamp glass, instrument panel, exterior linings, upholstery, automotive lights, head lights, parking lights, rear lights, stop lights, interior and exterior trims; door panels; gas tank; glazing front side; rear windows; seat backing, exterior panels, wire insulation, profile extrusion for sealing, cladding, pillar covers, chassis parts, exhaust systems, fuel filter/filler, fuel pumps, fuel tank, body side mouldings, convertible tops, exterior mirrors, exterior trim, fasteners/fixings, front end module, glass, hinges, lock systems, luggage/roof racks, pressed/stamped parts, seals, side impact protection, sound deadener/insulator and sunroof.

I-3) Road traffic devices, in particular sign postings, posts for road marking, car accessories, warning triangles, medical cases, helmets, tires.

I-4) Devices for plane, railway, motor car (car, motorbike) including furnishings.

I-5) Devices for space applications, in particular rockets and satellites, e.g. reentry shields.

I-6) Devices for architecture and design, mining applications, acoustic quietized systems, street refuges, and shelters.

II-1) Appliances, cases and coverings in general and electric/electronic devices (personal computer, telephone, portable phone, printer, television-sets, audio and video devices), flower pots, satellite TV bowl, and panel devices.

II-2) Jacketing for other materials such as steel or textiles.

II-3) Devices for the electronic industry, in particular insulation for plugs, especially computer plugs, cases for electric and electronic parts, printed boards, and materials for electronic data storage such as chips, check cards or credit cards.

II-4) Electric appliances, in particular washing machines, tumblers, ovens (microwave oven), dish-washers, mixers, and irons.

II-5) Covers for lights (e.g. street-lights, lamp-shades).

II-6) Applications in wire and cable (semi-conductor, insulation and cable-jacketing).

II-7) Foils for condensers, refrigerators, heating devices, air conditioners, encapsulating of electronics, semi-conductors, coffee machines, and vacuum cleaners.

III-1) Technical articles such as cogwheel (gear), slide fittings, spacers, screws, bolts, handles, and knobs.

III-2) Rotor blades, ventilators and windmill vanes, solar devices, swimming pools, swimming pool covers, pool liners, pond liners, closets, wardrobes, dividing walls, slat walls, folding walls, roofs, shutters (e.g. roller shutters), fittings, connections between pipes; sleeves, and conveyor belts.

III-3) Sanitary articles, in particular shower cubicles, lavatory seals, covers, and sinks.

III-4) Hygienic articles, in particular diapers (babies, adult incontinence), feminine hygiene articles, shower curtains, brushes, mats, tubs, mobile toilets, tooth brushes, and bed pans.

III-5) Pipes (cross-linked or not) for water, waste water and chemicals, pipes for wire and cable protection, pipes for gas, oil and sewage, guttering, down pipes, and drainage systems.

III-6) Profiles of any geometry (window panes) and siding.

III-7) Glass substitutes, in particular extruded plates, glazing for buildings (monolithic, twin or multiwall), aircraft, schools, extruded sheets, window film for architectural glazing, train, transportation, sanitary articles, and greenhouse.

III-8) Plates (walls, cutting board), extrusion-coating (photographic paper, tetrapack and pipe coating), silos, wood substitute, plastic lumber, wood composites, walls, surfaces, furniture, decorative foil, floor coverings (interior and exterior applications), flooring, duck boards, and tiles.

III-9) Intake and outlet manifolds.

III-10) Cement-, concrete-, composite-applications and covers, siding and cladding, hand rails, banisters, kitchen work tops, roofing, roofing sheets, tiles, and tarpaulins.

IV-1) Plates (walls and cutting board), trays, artificial grass, astroturf, artificial covering for stadium rings (athletics), artificial floor for stadium rings (athletics), and tapes.

IV-2) Woven fabrics continuous and staple, fibers (carpets/hygienic articles/geotextiles/monofilaments; filters; wipes/curtains (shades)/medical applications), bulk fibers applications such as gown/protection clothes), nets, ropes, cables, strings, cords, threads, safety seat-belts, clothes, underwear, gloves; boots; rubber boots, intimate apparel, garments, swimwear, sportswear, umbrellas (parasol, sunshade), parachutes, paraglides, sails, "balloon silk", camping articles, tents, airbeds, sun beds, bulk bags, and bags.

IV-3) Membranes, insulation, covers and seals for roofs, tunnels, dumps, ponds, dumps, walls roofing membranes, geomembranes, swimming pools, curtains (shades)/sunshields, awnings, canopies, wallpaper, food packing and wrapping (flexible and solid), medical packaging (flexible & solid), airbags/safety belts, arm- and head rests, carpets, centre console, dashboard, cockpits, door, overhead console module, door trim, headliners, interior lighting, interior mirrors, parcel shelf, rear luggage cover, seats, steering column, steering wheel, textiles, and trunk trim.

V) Films (packaging, dump, laminating, agriculture and horticulture, greenhouse, mulch, tunnel, silage), bale wrap, swimming pools, waste bags, wallpaper, stretch film, raffia, desalination film, batteries, and connectors.

VI-1) Food packing and wrapping (flexible and solid), bottles.

VI-2) Storage systems such as boxes (crates), luggage, chest, household boxes, pallets, shelves, tracks, screw boxes, packs, and cans.

VI-3) Cartridges, syringes, medical applications, containers for any transportation, waste baskets and waste bins, waste bags, bins, dust bins, bin liners, wheely bins, container in general, tanks for water/used water/chemistry/gas/oil/gasoline/diesel; tank liners, boxes, crates, battery cases, troughs, medical devices such as piston, ophthalmic applications, diagnostic devices, and packing for pharmaceuticals blister.

VII-1) Extrusion coating (photo paper, tetrapack, pipe coating), household articles of any kind (e.g. appliances, thermos bottle/clothes hanger), fastening systems such as plugs, wire and cable clamps, zippers, closures, locks, and snap-closures.

VII-2) Support devices, articles for the leisure time such as sports and fitness devices, gymnastics mats, ski-boots, inline-skates, skis, big foot, athletic surfaces (e.g. tennis grounds); screw tops, tops and stoppers for bottles, and cans.

VII-3) Furniture in general, foamed articles (cushions, impact absorbers), foams, sponges, dish clothes, mats, garden chairs, stadium seats, tables, couches, toys, building kits (boards/figures/balls), playhouses, slides, and play vehicles.

VII-4) Materials for optical and magnetic data storage.

VII-5) Kitchen ware (eating, drinking, cooking, storing).

VII-6) Boxes for CD's, cassettes and video tapes; DVD electronic articles, office supplies of any kind (ball-point pens, stamps and ink-pads, mouse, shelves, tracks), bottles of any volume and content (drinks, detergents, cosmetics including perfumes), and adhesive tapes.

VII-7) Footwear (shoes/shoe-soles), insoles, spats, adhesives, structural adhesives, food boxes (fruit, vegetables, meat, fish), synthetic paper, labels for bottles, couches, artificial joints (human), printing plates (flexographic), printed circuit boards, and display technologies.

VII-8) Devices of filled polymers (talc, chalk, china clay (kaolin), wollastonite, pigments, carbon black, $TiO_2$, mica, nanocomposites, dolomite, silicates, glass, asbestos).

Thus, a further embodiment of the present invention relates to a shaped article, in particular a film, pipe, profile, bottle, tank or container, fiber containing a composition as described above.

A further embodiment of the present invention relates to a molded article containing a composition as described above. The molding is in particular effected by injection, blow, compression, roto-molding or slush-molding or extrusion.

The present invention also relates to a process for the preparation of a synthetic polymer nanocomposite material which comprises melt mixing a mixture of a) a synthetic polymer, b) a filler, and c) a dispersing agent prepared by controlled free radical polymerization (CFRP).

The melt mixing can be carried out in any heatable container equipped with a stirrer, for example in a closed apparatus such as a kneader, mixer or stirred vessel. The incorporation is preferably carried out in an extruder or in a kneader. It is immaterial whether processing takes place in an inert atmosphere, or in the presence of oxygen.

The addition of components (a), (b) and (c) can be carried out in all customary mixing machines in which the polymer is melted and mixed with the additives. Suitable machines are known to those skilled in the art. They are predominantly mixers, kneaders and extruders. The process is preferably carried out in an extruder by introducing the additive during processing. Particularly preferred processing machines are single-screw extruders, contrarotating and corotating twin-crew extruders, planetary-gear extruders, ring extruders or cokneaders. It is also possible to use processing machines provided with at least one gas removal compartment to which a vacuum can be applied. Suitable extruders and kneaders are described, for example, in Handbuch der Kunststoffextrusion, Vol. 1, Grundlagen, Editors F. Hensen, W. Knappe, H. Potente, 1989, pp. 3-7, ISBN:3-446-14339-4; and Vol. 2 Extrusionsanlagen 1986, ISBN 3-446-14329-7. For example, the screw length is 1-60 screw diameters, preferably 35-48 screw diameters. The rotational speed of the screw is preferably 10 to 600 rotations per minute (rpm), for example 25-300 rpm. The maximum throughput is dependent on the screw diameter, the rotational speed and the driving force. The process of the present invention can also be carried out at a level lower than maximum throughput by varying the parameters mentioned or employing weighing machines delivering dosage amounts. If a plurality of components are added, these can be premixed or added individually.

Also of interest is a process for the preparation of a synthetic polymer nanocomposite material, wherein the melt mixing of the components (synthetic polymer, filler and dispersing agent prepared by controlled free radical polymerization) occurs between 120 and 290° C., preferably between 140 and 250° C., for example between 170 and 230° C.

The present invention also relates to synthetic polymer nanocomposites obtained by the above mentioned process.

The preferred components (b) and (c), and optionally further additives, in the process for the preparation of a synthetic polymer nanocomposite material are the same as those described for the composition.

A preferred embodiment of the present invention is also the use of a dispersing agent prepared by controlled free radical polymerization to intercalate and exfoliate a filler and disperse the filler in a synthetic polymer matrix to form a nanocomposite material.

The preferred dispersing agent, filler and synthetic polymer, and optionally further additives, for this use are the same as those described for the composition.

The following examples illustrate the invention further. Parts or percentages relate to weight.

EXAMPLE 1

Preparation of Dispersing Agents by Controlled Free Radical Polymerization

The preparation and characterization of block or comb copolymers by controlled free radical polymerization is disclosed for example in C. Auschra et al., Progress in Organic Coatings 45, 83-93 (2002). Based on these procedures the following block copolymers are prepared with the properties disclosed in Table 1.

TABLE 1

| Dispersing agent (Example) | Block 1 | Block 1 length[1] | Block 2 | Block 2 length[2] | $M_n$[3] | $M_w/M_n$[4] |
|---|---|---|---|---|---|---|
| 1a | PBA[5] | 58 | PDMAEA[6] | 16 | 7400 | 1.44 |
| 1b | PBA[5] | 100 | PDMAEA[6] | 30 | 11200 | 1.55 |
| 1c | PBMA[7] | 66 | PDMAEA[6] | 25 | n.d.[8] | n.d.[8] |

[1]Average number of monomer units of the first block.
[2]Average number of monomer units of the second block.
[3]Molecular weight obtained from $^1$HNMR integration.
[4]Polydispersity of polymer obtained from GPC with THF as solvent.
[5]PBA is poly(butyl acrylate).
[6]PDMAEA is poly(dimethylaminoethyl acrylate).
[7]PBMA is poly(butyl methacrylate).
[8]n.d. means "not determined".

EXAMPLE 2

Preparation of Polypropylene Nanocomposites in a Batch Mixer Based on Unmodified Sodium Montmorillonite 50 g of polypropylene [Basell KY 6100®], is blended with 0.25% of Irganox 1010® (pentaerythritol tetrakis[3-(3,5-di-tert-butyl-4-hydroxyphenyl)propionate]) and 0.25% of Irgafos 168® (tris(2,4-di-tert-butylphenyl)phosphite), 5% of a montmorillonite clay [Cloisite (Na$^+$)®) obtained from Southern Clay Industries] and 2.5% of a dispersing agent prepared by controlled free radical polymerisation (CFRP) according to Table 1 in a plastic cup and then added to a batch mixer operating at 25 rpm and 180° C., the mixture is then taken to 50 rpm for 10 minutes. Small scale injection moulding is performed with a CS-183 MMX Minimax moulder.

The mixing chamber is preheated to 230° C. and the mould is oven heated to 120° C. for one hour prior to injection moulding. Approximately 5 g of the material is placed in the mixing chamber and heated for 4 to 5 minutes. A small shot is taken form the CS-183 MMX Minimax moulder prior to placing the mould in position. Six tensile bars with the dimensions 18 mm by 5 mm by 0.85 mm are produced for each of the 5 g material.

Tensile testing is performed according to ASTM D 638 with a Rheometries mini material tensile tester [Minimat 2000®] equipped with a 1000 N load cell (40 mm/min). The results are summarized in Table 2.

TABLE 2

| Example | Dispersing agent | d-001 in Å[c] | Normalized Modulus of Elasticity[d] | Elongation at break (%)[e] |
|---|---|---|---|---|
| 2a[a] | none (and no filler) | — | 1.00 | 1.00 |
| 2b[a] | None | 10 | 1.12 | 0.97 |
| 2c[b] | Example 1a | 13 | 1.32 | 1.30 |
| 2d[b] | Example 1b | 13 | 1.04 | 1.26 |
| 2e[b] | Example 1c | n.d.[f] | n.d.[f] | n.d.[f] |

[a]Comparative Example.
[b]Example according to the invention.
[c]Interlayer distance determined by X-ray diffraction.
[d]Normalized modulus of elasticity relative to polypropylene processed under similar conditions (= 1.0).
[e]Normalized elongation at break relative to polypropylene processed under similar conditions (= 1.0).
[f]n.d. means "not determined".

The X-ray diffraction (XRD) spectra show that all copolymers synthesized via CFRP according to Table 2 intercalate the used clay in the direct melt blending experiments in the batch mixer. This is demonstrated by an increase in d-spacing of from 10 Å (comparative Example 2b) to 13 Å (Examples 2c and 2d according to the invention). The elasticity modulus of samples is enhanced by 4-32% with respect to polypropylene without dispersing agent and/or filler. Surprisingly, the elongation at break also enhanced by 26-30%.

EXAMPLE 3

Preparation of Acrylic Block or Gradient Copolymers by Raft Polymerization a) Preparation of Poly(Butyl Acrylate) (PBA)

A solution 200 g (1.56 mol) of butyl acrylate, 21.3 g (0.056 mol) of S-dodecyl S'-phenylethyl trithiocarbonate) and 915 mg (0.0056 mol) of AIBN in 200 ml of dry toluene is degassed by purging with argon for 3 hours. Polymerization is carried out at 70° C. with stirring under argon for 20 hours ($^1$H NMR: conversion 95%; GPC: Mn 3700, Mw/Mn 1.16).

b) Preparation of Poly(Butyl Acrylate)-Block-Poly (PEGMEA) (PBA-b-PPEGMEA)

A solution of 78.7 g (0.173 mol) of methyl (polyethylene glycol) monoacrylate (average DP=3.1) and 915 mg (0.0056 mol) of AIBN in 100 ml of dry toluene is degassed by purging with argon for 3 hours. This solution is added to the above solution [Example 3a] by syringe. The mixture is stirred at 60° C. under argon for 22 hours. The solvent is removed by evaporation under vacuum. (viscous yellow oil; $^1$H NMR: total conversion ~100%; GPC: Mn 4400, Mw/Mn 1.15).

c) Preparation of Poly(Butyl Acrylate)-Block-Poly (DEGEEA) (PBA-b-PDEGEEA)

A solution of 39.2 g (0.208 mol) of di(ethylene glycol) ethyl ether acrylate and 916 mg (0.0056 mol) of AIBN in 100 ml of dry toluene is degassed by purging with argon for 3 hours. This solution was added to the above solution [Example 3a] by syringe. The mixture is stirred at 60° C. under argon for 48 hours. The solvent is removed by evaporation under vacuum. (viscous yellow oil; $^1$H NMR: total conversion ~100%; GPC: not available due to incomplete solubility in THF).

d) Preparation of Poly(MMA-Grad-PEGMEA)

A solution of 240.0 g (2.392 mol) of methyl methacrylate, 60.0 g (0.132 mol) poly(ethylene glycol) methyl ether acrylate, 22.9 g (0.060 mol) of S-dodecyl S'-phenylethyl trithiocarbonate) and 1.47 g (0.0090 mol) of AIBN in 300 ml of dry toluene is degassed by purging with argon for 3 hours. The mixture is stirred at 70° C. under argon for 48 hours. The polymer is collected by precipitation into methanol. (yellow solid; $^1$H NMR: total conversion ~100%; GPC: Mn 7100, Mw/Mn 1.47).

e) Preparation of Poly(MMA-Grad-DEGEEA)

A solution of 240.0 g (2.392 mol) of methyl methacrylate, 60.0 g (0.319 mol) di(ethylene glycol) ethyl ether acrylate, 22.9 g (0.060 mol) of S-dodecyl S'-phenylethyl trithiocarbonate) and 985 mg (0.0060 mol) of AIBN in 300 ml of dry toluene is degassed by purging with argon for 3 hours. The mixture is stirred at 70° C. under argon for 48 hours. The polymer is collected by precipitation into methanol. (viscous yellow oil; $^1$H NMR: total conversion ~99%; GPC: Mn 5100, Mw/Mn 1.50).

configuration consists of a combination of mixing, kneading and conveying elements familiar to those skilled in the art. Materials are fed into the extruder via a JSW TTF20 gravimetric feeder (Feed 1) and a K-Tron KQX gravimetric feeder (Feed 2). The JSW TEX 30 is operated in a co rotating (intermeshing self wiping) mode with throughput of 10 kg/hr and a screw speed of 200 rpm. Vacuum venting is applied to the final barrel section. The extrudate is cooled in a water filled strand bath and pelletized.

In a first step a 10 wt % clay masterbatch is prepared. Feed 1 comprises a dry blend of polypropylene [Basell HP400N®] and a stabilizer which is composed of 0.25 wt % of Irganox 1010® (pentaerythritol tetrakis[3-3,5-di-tert-butyl-4-hydroxyphenyl)propionate]) and 0.25 wt % of Irgafos 168® (tris(2,4-di-tert-butylphenyl)phosphite). Feed 2 comprises a blend of the clay [Cloisite (Na$^+$)® obtained from Southern Clay Industries] and the non-ionic surfactant in the ratio defined in Table 4. All barrel sections are heated to 170° C.

In the second step the masterbatch is let down to the required clay level (see Table 4) by blending the masterbatch (Feed 2) with further polypropylene plus stabilizer (Feed 1). The first barrel section is heated at 180° C. the remaining barrel sections are heated at 200° C.

Injection moulding of the extruded samples are preformed with a Cincinnati Milacron VS55 28 mm diameter injection moulding machine comprising four temperature controlled sections of L/D23/1. The machine is operated at a clamp force of 50 tons and at a maximum injection pressure of 2005 bar.

Tensile testing is performed according to ISO 521 using an Instron 5500R material tensile tester. Tensile properties (vs polypropylene) for nanocomposite prepared with a ratio of copolymer:clay of 1:5 are summarized in Tables 4 and 5.

TABLE 3

| Dispersing agent (Example) | Block 1 | Block 1 length[1] | Block 2 | Block 2 length[2] | $M_n$[3] | $M_w/M_n$[4] |
|---|---|---|---|---|---|---|
| 3b | PBA[5] | 25.2 | PPEGMEA[6] | 2.8 | 4400 | 1.15 |
| 3c | PBA[5] | 28 | PDEGEEA[7] | 3.1 | 4600 | — |
| 3d | PMMA-grad-PEGMEA[9] | 56.6 | — | | 7100 | 1.47 |
| 3e | PMMA-grad-DEGEEA[8] | 42.5 | — | | 5100 | 1.50 |

[1] Average number of monomer units of the first block.
[2] Average number of monomer units of the second block.
[3] Molecular weight obtained from $^1$HNMR integration.
[4] Polydispersity of polymer obtained from GPC with THF as solvent.
[5] PBA is poly(butyl acrylate).
[6] PPEGMEA is poly(poly(ethylene glycol) methyl acrylate).
[7] PDEGEEA is poly(diethylene glycol ethyl acrylate).
[8] PMMA-grad-DEGEEA is poly(methyl methacrylate-grad-diethylene glycol ethyl acrylate) gradient copolymer (weight ratio MMA:DEGEEA 4:1)
[9] PMMA-grad-PEGMEA is poly(methyl methacrylate-grad-[poly(ethylene glycol) methyl acrylate)]) gradient copolymer (weight ratio MMA:PEGMEA 4:1)

EXAMPLE 4

Preparation of Polypropylene Nanocomposites in a Twin Screw Extruder

Processing is carried with a Japan Steel Works 30 mm diameter twin screw extruder of L/D ratio 42 (JSW TEX 30) that comprises ten temperature controlled barrel sections each with L/D of 3.5, three unheated sampling zones with L/D 1.167, and a cooled feed block with L/D 3.5. The screw

TABLE 4

| Example | Amount of Cloisite | Copolymer | Tensile Strength (MPa) | Modulus of Elasticity (MPa)[d] | Elongation at Break (%) |
|---|---|---|---|---|---|
| 4a[a] | none | none | 26.3 | 1470 | >800 |
| 4b[b] | 5% | 1% Example 3b | 26.9 | 1560 | 106 |
| 4c[b] | 5% | 1% Example 3c | 26.8 | 1540 | 141 |
| 4d[b] | 5% | 1% Example 3d | 26.3 | 1530 | 34 |

TABLE 4-continued

| Example | Amount of Cloisite | Copolymer | Tensile Strength (MPa) | Modulus of Elasticity (MPa)[d] | Elongation at Break (%) |
|---|---|---|---|---|---|
| 4e[b] | 5% | 1% Example 3e | 26.5 | 1590 | 31 |
| 4f[b] | 5% | 1% Example 1a | 26.8 | 1520 | 180 |
| 4g[b] | 5% | 1% Example 1c | 26.6 | 1510 | 140 |

TABLE 5

| Example | Amount of Cloisite | Copolymer | Tensile Strength (MPa) | Modulus of Elasticity (MPa)[d] | Elongation at Break (%) |
|---|---|---|---|---|---|
| 5a[a] | none | none | 25.5 | 1470 | >800 |
| 5b[b] | 1% | 1% Example 1a | 25.5 | 1826 | 49 |

[a]Comparative Example.
[b]Example according to the invention.

All examples of Table 4 demonstrate that the mechanical properties can be improved compared to polypropylene by using copolymers prepared by controlled radical polymerization according to the present invention.

What is claimed is:

1. A composition comprising
   a) a polyolefin,
   b) a nano-scale filler with one dimension <200 nm, and
   c) a gradient block copolymer dispersing agent prepared by controlled free radical polymerization (CFRP),
   wherein block copolymer is formed from the group of monomers consisting of maleic anhydride and octadecyl acrylate,
   wherein component (b) is present in an amount of from 0.1 to 40%, based on the weight of component (a) and component (c) is present in an amount of from 0.1 to 20%, based on the weight of component (a) and component c) has a polydispersity ranging from 1.05 to 2.0.

2. A composition according to claim 1, wherein component (b) is a natural or synthetic phyllosilicate or a mixture of such phyllosilicates.

3. A composition according to claim 1, wherein component (b) is a layered silicate clay.

4. A composition according to claim 1, wherein component (b) is a montmorillonite, bentonite, beidelite, mica, hectorite, saponite, nontronite, sauconite, vermiculite, ledikite, magadite, kenyaite, stevensite, volkonskoite, hydrotalcite or a mixture thereof.

5. A composition according to claim 1, comprising in addition, besides components (a), (b) and (c), further additives.

6. A composition according to claim 5, comprising as further additives phenolic antioxidants, light-stabilizers, processing stabilizers, solvents, pigments, dyes, plasticizers, compatibilizers, toughening agents and/or thixotropic agents.

7. A composition according to claim 1 in the form of a masterbatch or concentrate comprising component (a) in an amount of from 5 to 90%, component (b) in an amount of from 5 to 80%, and component (c) in an amount of from 0.5 to 50% by weight.

8. A composition according to claim 5, comprising (d) a nucleating agent as a further additive.

9. A composition according to claim 1, wherein the component c) has a molecular weight ranging from 2000 to 20000.

10. The composition according to claim 1, wherein the gradient block copolymer is formed from co-monomers with disparate reactivity ratios.

11. A process for the preparation of a synthetic polymer nanocomposite material which comprises melt mixing a mixture of a), b), and c) according to claim 1.

12. A process according to claim 11, wherein the melt mixing occurs between 120 and 290° C.

13. The process according to claim 12, wherein the melt mixing occurs between 170 and 230° C.

14. A synthetic polymer nanocomposite obtained by a process according to claim 11.

15. A method to exfoliate a filler and disperse the filler in a synthetic polymer matrix to form a nanocomposite material, which comprises melt mixing a mixture of a) a polyolefin, b) a filler, and c) an effective dispersing amount of a gradient block copolymer comprising a dispersing agent prepared by controlled free radical polymerization,
   wherein the gradient block copolymer is formed from the group of monomers consisting of maleic anhydride and octadecyl acrylate,
   and then forming the nanocomposite material,
   wherein component c) has a polydispersity ranging from 1.05 to 2.0 and the filler is a natural or synthetic phyllosilicate or a mixture of phyllosilicates.

* * * * *